US012307398B2

(12) United States Patent
Seifert et al.

(10) Patent No.: US 12,307,398 B2
(45) Date of Patent: May 20, 2025

(54) METHOD AND SYSTEM FOR MANAGING AND SOURCING MATERIALS AND SERVICES FOR ELECTRICATION PROJECTS

(71) Applicants: Michael J. Seifert, Hudson, OH (US); Rodney J. Seifert, Medina, OH (US); Jeffrey A. Seifert, Glen Ellyn, IL (US)

(72) Inventors: Michael J. Seifert, Hudson, OH (US); Rodney J. Seifert, Medina, OH (US); Jeffrey A. Seifert, Glen Ellyn, IL (US)

(73) Assignee: StreamLinx, LLC, Naperville, IL (US)

( * ) Notice: Subject to any disclaimer, the term of this patent is extended or adjusted under 35 U.S.C. 154(b) by 171 days.

(21) Appl. No.: 18/208,763

(22) Filed: Jun. 12, 2023

(65) Prior Publication Data

US 2023/0334393 A1 Oct. 19, 2023

Related U.S. Application Data

(63) Continuation-in-part of application No. 17/172,957, filed on Feb. 10, 2021, now Pat. No. 11,676,106, which is a continuation-in-part of application No. 17/070,720, filed on Oct. 14, 2020, now Pat. No. 11,402,415.

(51) Int. Cl.
  *G06Q 10/0631* (2023.01)
(52) U.S. Cl.
  CPC . *G06Q 10/06313* (2013.01); *G06Q 10/06315* (2013.01)
(58) Field of Classification Search
  CPC . G06Q 10/06313; G06Q 10/103; G06F 16/25
  See application file for complete search history.

(56) References Cited

U.S. PATENT DOCUMENTS 5,983,010 A   11/1999  Murdock et al.
7,552,065 B1   6/2009  Blanco
(Continued)

FOREIGN PATENT DOCUMENTS

WO   WO-0167346 A2    9/2001
WO   WO-2014088892 A1  6/2014

OTHER PUBLICATIONS

Kleindorfer, Paul. "Risk Management for Energy Efficiency Projects in Developing Countries." Insead Working Papers Collection, No. 18 (Apr. 10, 2010): 1-42. https://research.ebsco.com/linkprocessor/plink?id=922b3091-af85-31ca-bbec-206374c2ceOO. (Year: 2010)*

*Primary Examiner* — Maria C Santos-Diaz
(74) *Attorney, Agent, or Firm* — Lesavich High-Tech Law Group, S.C.; Stephen Lesavich

(57) ABSTRACT

A method and system for managing and sourcing materials and services for electrification projects. An electrification project portal provides real-time designing, specifying, searching, pricing, quoting, ordering, and tracking of energy audit project materials and services required for a desired electrification project. An electrification project includes replacing fossil-fuel powered devices with devices powered by electricity generated from stored power devices and other electricity sources. The functionality of the electrification project portal is available in real-time directly and from within existing design programs that create and provide electrification projects and available as a standalone portal.

22 Claims, 24 Drawing Sheets

(56) References Cited

U.S. PATENT DOCUMENTS

| | | |
|---|---|---|
| 7,565,643 B1 | 7/2009 | Sweet |
| 8,095,393 B2 | 1/2012 | Seifert et al. |
| 8,285,603 B2 | 10/2012 | Carlin et al. |
| 8,463,765 B2 | 6/2013 | Lesavich |
| 8,494,922 B2 | 7/2013 | Carlin, Jr. et al. |
| 8,805,000 B2 | 8/2014 | Derby et al. |
| 8,849,685 B2 | 9/2014 | Oden |
| 9,026,261 B2 | 5/2015 | Bukhin |
| 9,026,405 B2 | 5/2015 | Buckley |
| 9,037,564 B2 | 5/2015 | Lesavich et al. |
| 9,090,203 B2 | 7/2015 | Seifert |
| 9,137,250 B2 | 9/2015 | Lesavich et al. |
| 9,218,632 B2 | 12/2015 | Venkatakrishnan et al. |
| 9,361,479 B2 | 6/2016 | Lesavich et al. |
| 9,569,771 B2 | 2/2017 | Lesavich et al. |
| 9,782,936 B2 | 10/2017 | Glunz et al. |
| 9,817,922 B2 | 11/2017 | Glunz et al. |
| 9,863,979 B2 | 1/2018 | Kymissis et al. |
| 9,958,360 B2 | 5/2018 | Dasgupta |
| 10,248,653 B2 | 4/2019 | Blassin |
| 10,274,916 B2 | 4/2019 | Shen et al. |
| 10,366,378 B1 | 7/2019 | Han |
| 10,867,282 B2 | 12/2020 | Glunz |
| 10,940,805 B2* | 3/2021 | Rustwick .......... B62D 33/0207 |
| 10,956,497 B1 | 3/2021 | Plymale |
| 11,036,938 B2* | 6/2021 | Alexander ............ G06F 16/951 |
| 11,402,415 B2 | 8/2022 | Seifert et al. |
| 11,676,106 B2 | 6/2023 | Seifert et al. |
| 2004/0073410 A1 | 4/2004 | Maly |
| 2005/0071135 A1 | 3/2005 | Vredenburgh |
| 2006/0241982 A1 | 10/2006 | Seifert et al. |
| 2009/0319308 A1 | 12/2009 | Guiltner |
| 2011/0029341 A1 | 2/2011 | Muse |
| 2011/0208710 A1 | 8/2011 | Lesavich |
| 2012/0053740 A1 | 3/2012 | Venkatakrishnan |
| 2012/0278622 A1 | 11/2012 | Lesavich et al. |
| 2013/0262040 A1 | 10/2013 | Buckley |
| 2014/0019319 A1 | 1/2014 | Derby |
| 2014/0052303 A1 | 2/2014 | Venkatakrishnan |
| 2014/0189792 A1 | 7/2014 | Lesavich et al. |
| 2014/0244329 A1* | 8/2014 | Urban ........... G06Q 10/063114 705/7.15 |
| 2014/0368324 A1 | 12/2014 | Seifert |
| 2014/0368642 A1 | 12/2014 | Balazs |
| 2015/0188927 A1 | 7/2015 | Santhi |
| 2015/0213567 A1 | 7/2015 | Lopez |
| 2015/0228003 A1 | 8/2015 | Lyoob |
| 2015/0248503 A1 | 9/2015 | Glunz et al. |
| 2015/0248504 A1 | 9/2015 | Glunz et al. |
| 2015/0308856 A1 | 10/2015 | Srinivasan |
| 2015/0366035 A1 | 12/2015 | Baek |
| 2015/0379301 A1 | 12/2015 | Lesavich et al. |
| 2016/0162478 A1 | 6/2016 | Blassin |
| 2016/0246271 A1 | 8/2016 | Shen |
| 2016/0321654 A1 | 11/2016 | Lesavich et al. |
| 2017/0048598 A1 | 2/2017 | Foster |
| 2017/0132567 A1 | 5/2017 | Glunz et al. |
| 2017/0132568 A1 | 5/2017 | Glunz et al. |
| 2017/0140307 A1 | 5/2017 | Gottemukkala |
| 2017/0140485 A1 | 5/2017 | Balzs |
| 2017/0337287 A1 | 11/2017 | Gill |
| 2018/0365776 A1 | 12/2018 | Chan |
| 2019/0121855 A1* | 4/2019 | Alexander ............ G06F 16/248 |
| 2019/0294018 A1 | 9/2019 | Shrivastava |
| 2019/0347670 A1 | 11/2019 | Abramson |
| 2020/0134560 A1 | 4/2020 | McLinden et al. |
| 2020/0134745 A1 | 4/2020 | McLinden et al. |
| 2020/0380080 A1 | 12/2020 | Glunz |
| 2022/0113690 A1 | 4/2022 | Seifert et al. |
| 2022/0358430 A1 | 11/2022 | Seifert et al. |
| 2023/0334393 A1 | 10/2023 | Seifert et al. |

* cited by examiner

PROTOCOL STACK

FIG. 7A

START

↓

AN ELECTRONIC FLOORPLAN OF A BUILDING FOR CONDUCTING AN ENERGY AUDIT OF ENERGY CONSUMING COMPONENTS IS PROVIDED ON AN ENERGY AUDIT APPLICATION ON NETWORK DEVICE WITH ONE OR MORE PROCESSORS, A NON-TRANSITORY COMPUTER READABLE MEDIUM AND A COMMUNICATIONS INTERFACE FOR CONNECTING THE NETWORK DEVICE TO A COMMUNICATIONS NETWORK — 108

↓

A CONFIGURABLE ELECTRONIC TEMPLATE IS PROVIDED ON ENERGY AUDIT APPLICATION THE NETWORK DEVICE FOR CONDUCTING THE ENERGY AUDIT OF THE ENERGY CONSUMING COMPONENTS, THE CONFIGURABLE ELECTRONIC TEMPLATE DYNAMICALLY CONFIGURABLE DURING THE ENERGY AUDIT — 110

↓

THE NETWORK DEVICE IS MOVED PHYSICALLY INTO AND AROUND THE BUILDING TO A PLURAL DIFFERENT PHYSICAL LOCATIONS WITHIN THE BUILDING, THE NETWORK DEVICE IS NOT CONNECTED TO THE COMMUNICATION NETWORK WITHIN THE BUILDING AND A SELECTED PHYSICAL LOCATION OF THE NETWORK DEVICE IN THE BUILDING CORRESPONDS TO A SELECTED VIRTUAL LOCATION ON THE ELECTRONIC FLOORPLAN FOR THE BUILDING — 112

↓

(A) → A CREATION SELECTION INPUT IS RECEIVED ON ON THE ENERGY AUDIT APPLICATION ON THE NETWORK DEVICE TO CREATE A GRAPHICAL MARKER FOR A SELECTED ENERGY CONSUMING COMPONENT AT A SPECIFIC LOCATION ON THE ELECTRONIC FLOORPLAN OF THE BUILDING — 114

↓

A GRAPHICAL MARKER IS DISPLAYED IN A FIRST COLOR ON THE ENERGY AUDIT APPLICATION ON THE NETWORK COMPONENT AT THE SPECIFIC LOCATION ON THE ELECTRONIC FLOORPLAN OF THE BUILDING FOR THE SELECTED ENERGY CONSUMING COMPONENT — 116

118 — PLURAL COLLECTION SELECTION INPUTS ARE RECEIVED ON THE ENERGY AUDIT APPLICATION ON NETWORK DEVICE INCLUDING: (A) AUDIO INFORMATION FROM AN AUDIO COMPONENT ON THE NETWORK DEVICE (B) VISUAL INFORMATION FROM A CAMERA COMPONENT ON THE NETWORK DEVICE, AND (C) ELECTRONIC INFORMATION FROM AN ELECTRONIC KEYBOARD COMPONENT ON THE NETWORK DEVICE, THE AUDIO, VISUAL AND ELECTRONIC INFORMATION INCLUDING INFORMATION COLLECTED FOR THE SELECTED ENERGY CONSUMING COMPONENT AT THE SPECIFIC LOCATION ON THE ELECTRONIC FLOORPLAN OF THE BUILDING

↓

120 — THE RECEIVED AUDIO, VISUAL AND ELECTRONIC INFORMATION IS STORED IN THE CONFIGURABLE ELECTRONIC TEMPLATE ON THE ENERGY AUDIT APPLICATION ON NETWORK DEVICE

↓

122 — STEPS 114 THROUGH 120 ARE REPEATED FOR PLURAL OF OTHER SELECTED ENERGY CONSUMING COMPONENTS AT PLURAL OTHER SPECIFIC LOCATIONS ON THE ELECTRONIC FLOORPLAN OF THE BUILDING (TO A FIG. 7A)

↓

124 — AN ENERGY AUDIT SUMMARY REPORT IS CREATED ON THE ENERGY AUDIT APPLICATION ON THE NETWORK DEVICE WITH THE STORED AUDIO, VISUAL AND ELECTRONIC INFORMATION. THE ENERGY AUDIT SUMMARY REPORT IS DYNAMICALLY UPDATED ON THE ENERGY AUDIT APPLICATION ON THE NETWORK DEVICE AS ENERGY CONSUMING COMPONENTS ARE IDENTIFIED IN THE BUILDING

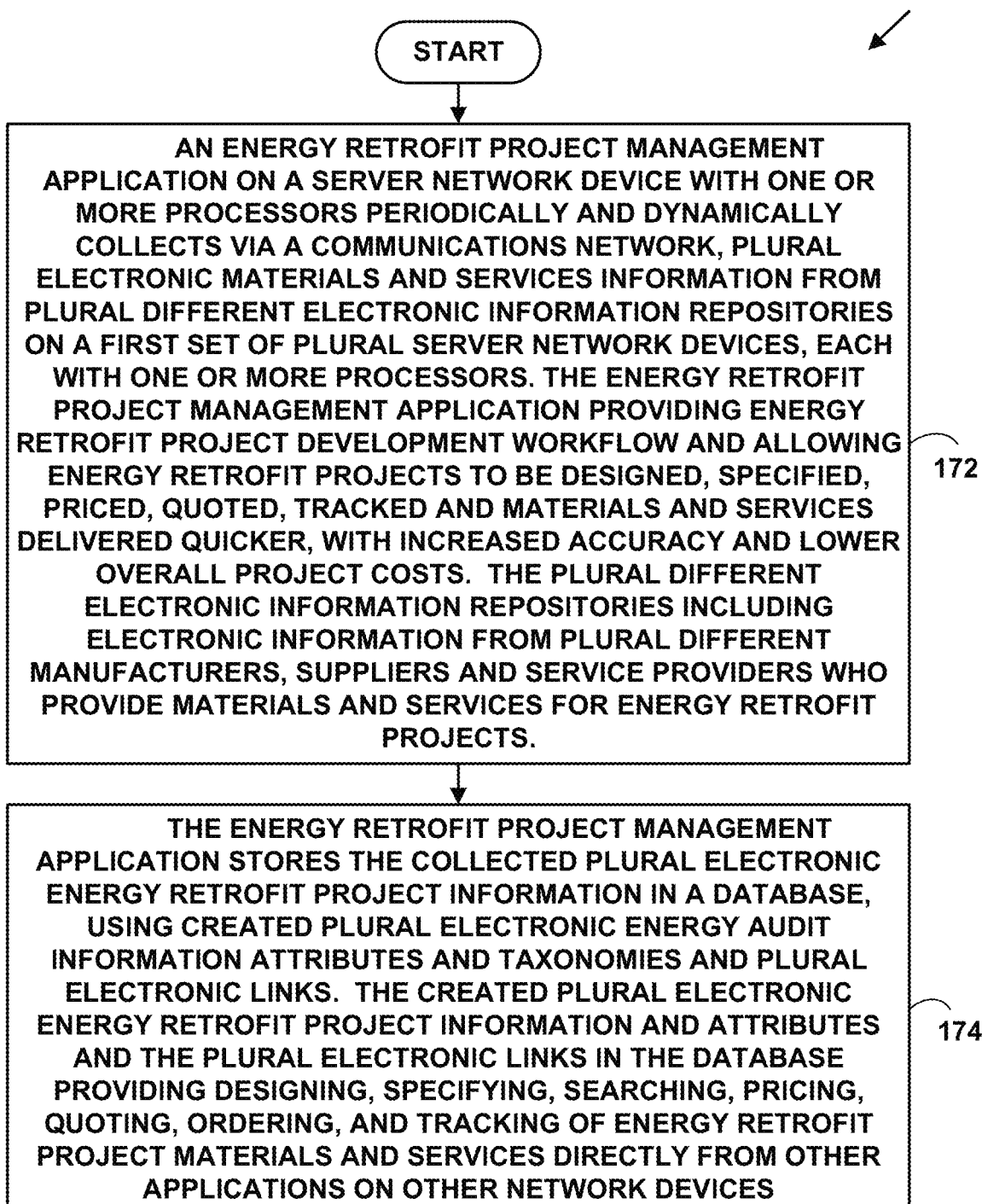

| THE ENERGY RETROFIT PROJECT MANAGEMENT APPLICATION AUTOMATICALLY AND DYNAMICALLY CREATES PLURAL ENERGY RETROFIT PROJECT SOLUTIONS FOR A FIRST SET OF ENERGY RETROFIT PROJECT MATERIALS AND SERVICES REQUIRED FOR A FIRST SET OF ENERGY RETROFIT PROJECTS BY AUTOMATICALLY LINKING A FIRST SET OF ELECTRONIC INFORMATION STORED IN THE DATABASE TO A FIRST SET OF PLURAL ENERGY RETROFIT PROJECT MATERIALS AND SERVICES FROM A FIRST SET OF PLURAL MANUFACTURERS, SUPPLIERS AND SERVICE PROVIDERS WITH THE CREATED PLURAL ELECTRONIC ENERGY RETROFIT PROJECT INFORMATION ATTRIBUTES AND TAXONOMIES AND THE PLURAL ELECTRONIC LINKS | 176 |

↓

| THE ENERGY RETROFIT PROJECT MANAGEMENT APPLICATION PERIODICALLY AND DYNAMICALLY RECEIVES A SET OF PLURAL EXTERNAL ENERGY RETROFIT PROJECT SOLUTIONS FOR A SECOND SET OF ENERGY RETROFIT PROJECT MATERIALS AND SERVICES REQUIRED FOR A SECOND SET OF A PLURAL ENERGY RETROFIT PROJECTS FROM A SECOND SET OF PLURAL SERVER NETWORK DEVICES EACH WITH ONE OR MORE PROCESSORS, VIA THE COMMUNICATIONS NETWORK, THE SET OF PLURAL EXTERNAL ENERGY RETROFIT SOLUTIONS CREATED FOR A SECOND SET OF A PLURAL MANUFACTURERS, SUPPLIERS AND SERVICE PROVIDERS BY THEPLURAL MANUFACTURERS, SUPPLIERS AND SERVICE PROVIDERS | 178 |

↓

| THE ENERGY RETROFIT PROJECT MANAGEMENT APPLICATION STORES THE RECEIVED SET OF PLURAL EXTERNAL ENERGY RETROFIT PROJECT MANAGEMENT SOLUTIONS IN THE DATABASE USING THE CREATED PLURAL ELECTRONIC ENERGY RETROFIT PROJECT INFORMATION ATTRIBUTES AND TAXONOMIES AND THE PLURAL ELECTRONIC LINKS | 180 |

AN ELECTRONIC ENERGY RETROFIT PROJECT PORTAL IS PROVIDED WITH THE ENERGY RETROFIT PROJECT MANAGEMENT APPLICATION AND DATABASE ON THE SERVER NETWORK DEVICE TO A THIRD SET OF PLURAL NETWORK DEVICES EACH WITH ONE OR MORE PROCESSORS, VIA THE COMMUNICATIONS NETWORK FOR MANAGING AND PROVIDING MATERIALS AND SERVICES FOR ENERGY RETROFIT PROJECTS — 182

↓

A DESIGN COMPONENT INTERFACE IS PROVIDED ON THE ENERGY AUDIT PORTAL ALLOWING THE THIRD SET OF NETWORK DEVICES TO INTERFACE PLURAL ENERGY RETROFIT PROJECTS DESIGNS FOR PLURAL DESIRED ENERGY RETROFIT PROJECTS, THE PLURAL ENERGY RETROFIT PROJECT DESIGNS ARE CREATED WITH EXTERNAL ENERGY AUDIT APPLICATIONS AND/OR EXTERNAL ENERGY RETROFIT PROJECT DESIGN APPLICATIONS — 184

↓

A REQUEST FOR DESIGN COMPONENT IS PROVIDED ON THE ENERGY RETROFIT PROJECT PORTAL TO DIRECTLY ENGAGE MANUFACTURERS, SUPPLIERS AND DESIGN ENGINEERS WHO HAVE EXPERTISE IN DESIGNING ENERGY EFFICIENT SYSTEMS TO ASSIST IN A DESIGN PROCESS FOR A DESIRED ENERGY RETROFIT PROJECT — 186

↓

A REQUEST FOR QUOTE COMPONENT IS PROVIDED ON THE ENERGY RETROFIT PROJECT PORTAL TO REQUEST PRICE QUOTES FOR A REQUIRED SET OF ENERGY RETROFIT PROJECT MATERIALS AND SERVICES FOR THE DESIRED ENERGY RETROFIT PROJECT — 188

↓

A REQUEST FOR ORDER COMPONENT IS PROVIDED ON THE ENERGY RETROFIT PROJECT PORTAL TO ORDER THE REQUIRED SET OF ENERGY RETROFIT PROJECT MATERIALS FOR THE DESIRED ENERGY RETROFIT PROJECT — 190

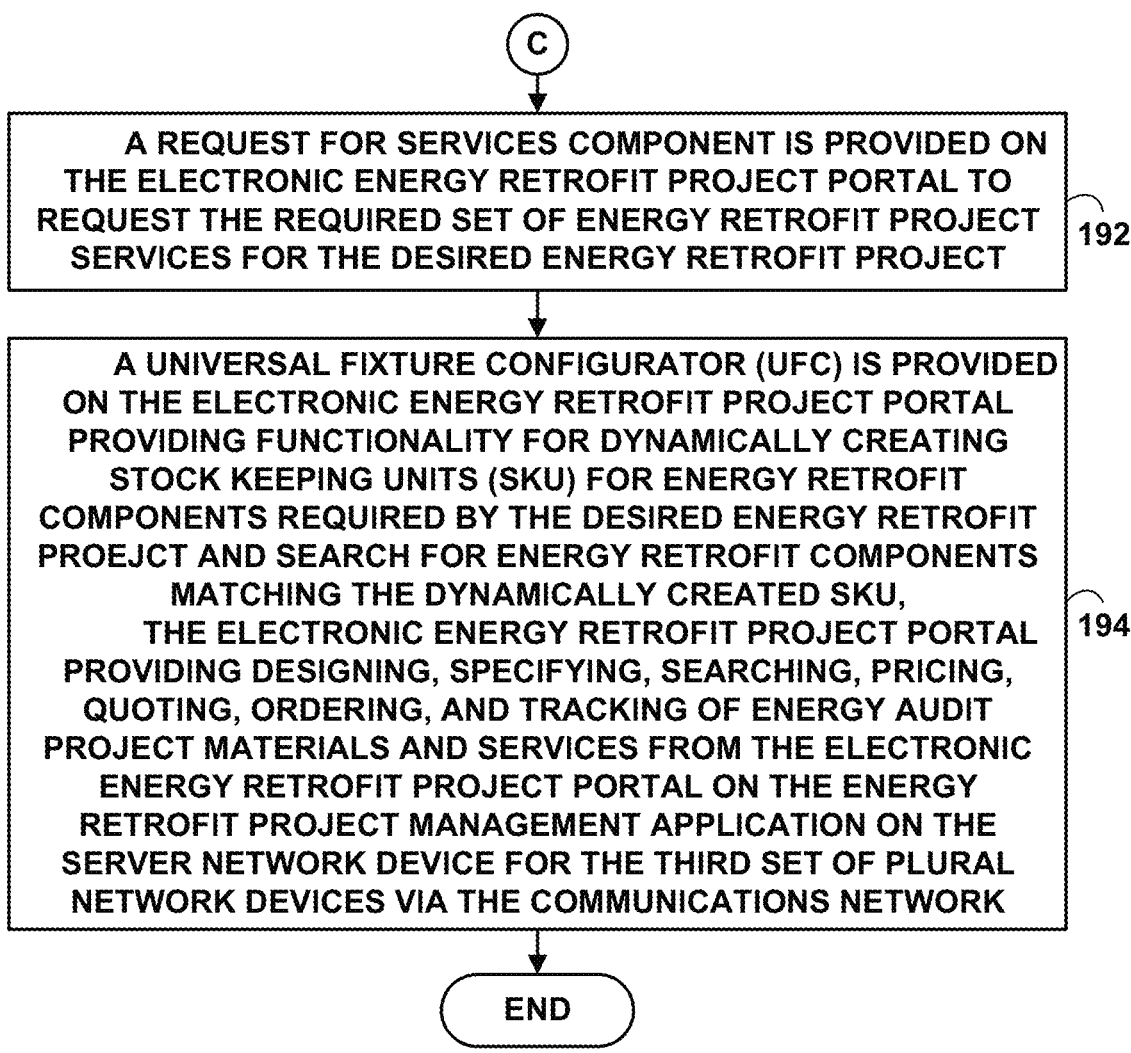

FIG. 16A

```
                    START
                      │
                      ▼
┌─────────────────────────────────────────────┐
│ AN ELECTRIFICATION PROJECT MANAGEMENT        │
│ APPLICATION ON A SERVER NETWORK DEVICE WITH  │
│ ONE OR MORE PROCESSORS PERIODICALLY AND      │
│ DYNAMICALLY COLLECTS VIA A COMMUNICATIONS    │
│ NETWORK, PLURAL ELECTRONIC MATERIALS AND     │
│ SERVICES INFORMATION FROM PLURAL DIFFERENT   │
│ ELECTRONIC INFORMATION REPOSITORIES ON A     │
│ FIRST SET OF PLURAL SERVER NETWORK DEVICES,  │
│ EACH WITH ONE OR MORE PROCESSORS, THE        │
│ ELECTRIFICATION PROJECT MANAGEMENT           │   230
│ APPLICATION PROVIDING ELECTRIFICATION        │
│ PROJECT DEVELOPMENT WORKFLOW AND ALLOWING    │
│ ELECTRIFICATION PROJECTS TO BE DESIGNED,     │
│ SPECIFIED, PRICED, QUOTED, TRACKED AND       │
│ MATERIALS AND SERVICES DELIVERED QUICKER,    │
│ WITH INCREASED ACCURACY AND LOWER OVERALL    │
│ PROJECT COSTS. THE PLURAL DIFFERENT          │
│ ELECTRONIC INFORMATION REPOSITORIES          │
│ INCLUDING ELECTRONIC INFORMATION FROM        │
│ PLURAL DIFFERENT MANUFACTURERS, SUPPLIERS    │
│ AND SERVICE PROVIDERS WHO PROVIDE MATERIALS  │
│ AND SERVICES FOR ELECTRIFICATION PROJECTS    │
└─────────────────────────────────────────────┘
                      │
                      ▼
┌─────────────────────────────────────────────┐
│ THE ELECTRIFICATION PROJECT MANAGEMENT       │
│ APPLICATION STORES THE COLLECTED PLURAL      │
│ ELECTRIFICATION PROJECT INFORMATION IN A     │
│ DATABASE, USING A CREATED PLURAL ELECTRONIC  │
│ ENERGY AUDIT INFORMATION ATTRIBUTES AND      │
│ TAXONOMIES AND PLURAL ELECTRONIC LINKS, THE  │
│ CREATED PLURAL ELECTRIFICATION PROJECT       │   232
│ INFORMATION AND ATTRIBUTES AND THE PLURAL    │
│ ELECTRONIC LINKS IN THE DATABASE PROVIDING   │
│ DESIGNING, SPECIFYING, SEARCHING, PRICING,   │
│ QUOTING, ORDERING, AND TRACKING OF           │
│ ELECTRIFICATION PROJECT MATERIALS AND        │
│ SERVICES DIRECTLY FROM OTHER APPLICATIONS    │
│ ON OTHER NETWORK DEVICES                     │
└─────────────────────────────────────────────┘
                      │
                      ▼
                  ( TO A FIG. 16B )
```

THE ELECTRIFICATION PROJECT MANAGEMENT APPLICATION AUTOMATICALLY AND DYNAMICALLY CREATES PLURAL ELECTRIFICATION PROJECT SOLUTIONS FOR A FIRST SET OF ELECTRIFICATION PROJECT MATERIALS AND SERVICES REQUIRED FOR A FIRST SET OF ELECTRIFICATION PROJECTS — 234

↓

THE ELECTRIFICATION PROJECT MANAGEMENT APPLICATION AUTOMATICALLY LINKS A FIRST SET OF ELECTRONIC INFORMATION STORED IN THE DATABASE TO A FIRST SET OF PLURAL ELECTRIFICATION PROJECT MATERIALS AND SERVICES FROM A FIRST SET OF PLURAL MANUFACTURERS, SUPPLIERS AND SERVICE PROVIDERS WITH THE CREATED PLURAL ELECTRIFICATION PROJECT INFORMATION ATTRIBUTES AND TAXONOMIES AND THE PLURAL ELECTRONIC LINKS — 236

↓

THE ELECTRIFICATION PROJECT MANAGEMENT APPLICATION PERIODICALLY AND DYNAMICALLY RECEIVES A SET OF PLURAL EXTERNAL ELECTRIFICATION PROJECT SOLUTIONS FOR A SECOND SET OF ELECTRIFICATION PROJECT MATERIALS AND SERVICES REQUIRED FOR A SECOND SET OF A PLURAL ELECTRIFICATION PROJECTS FROM A SECOND SET OF PLURAL SERVER NETWORK DEVICES EACH WITH ONE OR MORE PROCESSORS, VIA THE COMMUNICATIONS NETWORK. THE SET OF PLURAL EXTERNAL ELECTRIFICATION SOLUTIONS CREATED FOR A SECOND SET OF A PLURAL MANUFACTURERS, SUPPLIERS AND SERVICE PROVIDERS BY THE PLURAL MANUFACTURERS, SUPPLIERS AND SERVICE PROVIDERS — 238

↓

THE ELECTRIFICATION PROJECT MANAGEMENT APPLICATION STORES THE RECEIVED SET OF PLURAL EXTERNAL ELECTRIFICATION PROJECT MANAGEMENT SOLUTIONS IN THE DATABASE USING THE CREATED PLURAL ELECTRIFICATION PROJECT INFORMATION ATTRIBUTES AND TAXONOMIES AND THE PLURAL ELECTRONIC LINKS — 240

AN ELECTRIFICATION PROJECT PORTAL IS PROVIDED WITH THE ELECTRIFICATION PROJECT MANAGEMENT APPLICATION AND DATABASE ON THE SERVER NETWORK DEVICE TO A THIRD SET OF PLURAL NETWORK DEVICES EACH WITH ONE OR MORE PROCESSORS, VIA THE COMMUNICATIONS NETWORK FOR MANAGING AND PROVIDING MATERIALS AND SERVICES FOR ELECTRIFICATION PROJECTS — 242

↓

A DESIGN COMPONENT INTERFACE IS PROVIDED ON THE ENERGY AUDIT PORTAL ALLOWING THE THIRD SET OF NETWORK DEVICES TO INTERFACE A PLURAL ELECTRIFICATION PROJECTS DESIGNS FOR PLURAL DESIRED ELECTRIFICATION PROJECTS. THE PLURAL ELECTRIFICATION PROJECT DESIGNS ARE CREATED WITH EXTERNAL ENERGY AUDIT APPLICATIONS AND/OR EXTERNAL ELECTRIFICATION PROJECT DESIGN APPLICATIONS — 244

↓

A REQUEST FOR DESIGN COMPONENT IS PROVIDED ON THE ELECTRIFICATION PROJECT PORTAL TO DIRECTLY ENGAGE MANUFACTURERS, SUPPLIERS AND DESIGN ENGINEERS WHO HAVE EXPERTISE IN DESIGNING ENERGY EFFICIENT SYSTEMS TO ASSIST IN A DESIGN PROCESS FOR A DESIRED ELECTRIFICATION PROJECT — 246

↓

A REQUEST FOR QUOTE COMPONENT IS PROVIDED ON THE ELECTRIFICATION PROJECT PORTAL TO REQUEST PRICE QUOTES FOR A REQUIRED SET OF ELECTRIFICATION PROJECT MATERIALS AND SERVICES FOR THE DESIRED ELECTRIFICATION PROJECT — 248

↓

A REQUEST FOR ORDER COMPONENT IS PROVIDED ON THE ELECTRIFICATION PROJECT PORTAL TO ORDER THE REQUIRED SET OF ELECTRIFICATION PROJECT MATERIALS FOR THE DESIRED ELECTRIFICATION PROJECT — 250

A REQUEST FOR SERVICES COMPONENT IS PROVIDED ON THE ELECTRONIC PORTAL TO REQUEST THE REQUIRED SET OF ELECTRIFICATION PROJECT SERVICES FOR THE DESIRED ELECTRIFICATION PROJECT — 251

A UNIVERSAL FIXTURE CONFIGURATOR (UFC) IS PROVIDED ON THE ELECTRIFICATION PROJECT PORTAL PROVIDING FUNCTIONALITY FOR DYNAMICALLY CREATING STOCK KEEPING UNITS (SKU) FOR ELECTRIFICATION COMPONENTS REQUIRED BY THE DESIRED ELECTRIFICATION PROJECT AND SEARCHING FOR ELECTRIFICATION COMPONENTS THAT MATCH THE DYNAMICALLY CREATED SKUS, THE ELECTRIFICATION PROJECT PORTAL PROVIDING DESIGNING, SPECIFYING, SEARCHING, PRICING, QUOTING, ORDERING AND TRACKING OF ELECTRIFICATION PROJECT MATERIALS AND SERVICES FROM THE ELECTRIFICATION PROJECT PORTAL ON THE ELECTRIFICATION PROJECT MANAGEMENT APPLICATION ON THE SERVER NETWORK DEVICE VIA THE COMMUNICATIONS NETWORK FOR MANAGEMENT AND PROVIDING MATERIALS AND SERVICES FOR ELECTRIFICATION PROJECTS FOR A FOR THE THIRD SET OF PLURAL NETWORK DEVICES VIA THE COMMUNICATIONS NETWORK — 254

END

METHOD AND SYSTEM FOR MANAGING AND SOURCING MATERIALS AND SERVICES FOR ELECTRICATION PROJECTS

CROSS REFERENCES TO RELATED APPLICATIONS

The U.S. Utility patent application is a Continuation-In-Part (CIP) of U.S. utility patent application Ser. No. 17/172,957, filed on Feb. 10, 2021, which issued as U.S. Pat. No. 11,676,106, on Jun. 13, 2023, which is a CIP of U.S. utility patent application No., 17/070,720, filed Oct. 14, 2020, which issued as U.S. Pat. No. 11,402,405, on Aug. 2, 2022, the contents of all of which are incorporated by reference.

FIELD OF INVENTION

This invention relates to managing electrification projects. More specifically, it relates to a method and system for managing and sourcing materials and services for electrification projects via a communications network.

BACKGROUND OF THE INVENTION

In commercial, industrial, and governmental buildings, including buildings in the municipal, university, schools and hospital (MUSH) sectors, there are a large number of energy consuming devices such as lighting, controls, heating, ventilation, air conditioning, etc. These energy consuming devices often include devices manufactured by multiple different companies and include devices installed and replaced during many different time periods.

A commercial or industrial building (e.g., office, factory, etc.) typically includes a variety of energy consuming devices that may be using older technologies, be inefficient, include devices that are no longer available, etc. For example, a building may include a mix of old inefficient incandescent lighting or florescent lighting and more efficient Light Emitting Diode (LED) lighting. The building may include transformers or starters for their florescent lighting that are energy inefficient or are no longer manufactured and available for purchase.

A commercial or industrial building may also include, or be associated with energy producing devices, such as solar panels, wind turbines, hydroelectric generators, biomass generators or nuclear reactors. These energy producing devices also include components manufactured by multiple different companies and include components installed and replaced during many different time periods.

Companies performing energy consumption audits and retrofit projects on commercial and industrial buildings must first gather the "as-is" environment of a building to create an existing energy footprint, and to understand critical space details required to estimate and carryout an energy audit or energy upgrade project.

To complete an energy audit or energy retrofit project, a building engineer must physically walk through the building collecting counts, space details and pictures of energy consuming devices and energy produces devices that reside in the building. This data collection process is referred to as an Energy "Audit," "Survey," "Walk-through," "Assessment," or "Pre-view."

Historically, this data collection process has been done on paper and then transcribed into a spreadsheet, a process that is time-consuming and error prone. Commercial, industrial and Municipal, University, School and Hospital (MUSH) market buildings are large and include a huge number of energy consumption or energy producing components. A commercial building may include many different floors and an industrial building may include many hundreds of thousands of square feet. A manual energy audit takes a large amount of time is subject to many different types of collection errors.

Companies performing energy retrofit projects on commercial and industrial buildings often utilize existing digital project development software platforms to conduct energy audits, develop quotes and implement project rollout. There are several problems associated with such existing digital project development software platforms.

One problem is that in addition to performing the up-front engineering and design, energy retrofit projects require the procurement of project materials (equipment, fixtures, and parts) as well as needed services (labor, design, consulting, etc.).

Another problem is that searching for, designing, specifying, pricing, and configuring such materials and services while developing energy retrofit projects requires extensive manual research and time on behalf of the engineer or contractor to solicit bids and quotes from manufacturers, their agents or distributors. This process is made more difficult when bids, quotes and other information from vendors requires manual and time-consuming and error-prone data re-entry into their retrofit project development system. This manual process often results in project delay, error, and cost overruns.

Another problem is that suppliers of both products and services wish to make their offerings more visible, more compelling, and easier to find, quote and order for their customers including contractors and engineers. In addition, critical data for energy-related products is becoming more complicated to manage, track and communicate with channel partners and customers. Product specification data is voluminous and product life cycles are becoming shorter making the management and dissemination task more difficult.

Another problem is that in addition to managing ever-changing product data, suppliers and their channel partners struggle to integrate and respond to needed requests for information, pricing and availability of products within the existing project management systems and communication through the channels used by contractors and engineers to develop energy retrofit projects.

Another problem is that there is a growing demand for converting from fossil-fuel powered devices to that of ones powered strictly by electricity. Such conversions are called "electrification" projects. For example, a pump what dispenses gasoline is converted to an electric vehicle (EV) charging station. An EV charging station, also known as a charge point or electric vehicle supply equipment, is a piece of equipment that supplies electrical power for charging plug-in electric vehicles.

Thus, it is desirable to solve some the problems associated with designing, specifying, pricing, configuring and staffing electrification projects.

SUMMARY OF THE INVENTION

In accordance with preferred embodiments of the present invention, some of the problems associated with designing, specifying, pricing, configuring and staffing electrification projects are overcome. A method and system for managing and sourcing materials and services for electrification projects via a communications network is presented.

An electrification project portal provides real-time designing, specifying, searching, pricing, quoting, ordering, and tracking of energy audit project materials and services required for a desired electrification project. An electrification project includes replacing fossil-fuel powered devices with devices powered by electricity generated from stored power devices and other electricity sources. The functionality of the electrification project portal is available in real-time directly and from within existing design programs that create and provide electrification projects and available as a standalone portal.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 11A, 11B, 11C and 11D are a flow diagram illustrating a method for managing and sourcing materials and services for energy retrofit projects;

FIGS. 16A, 16B, 16C and 16D are a flow diagram illustrating a method for managing and sourcing materials and services for energy retrofit projects.

DETAILED DESCRIPTION OF THE INVENTION

Exemplary Electronic Message Processing and Display System

Figure 1:
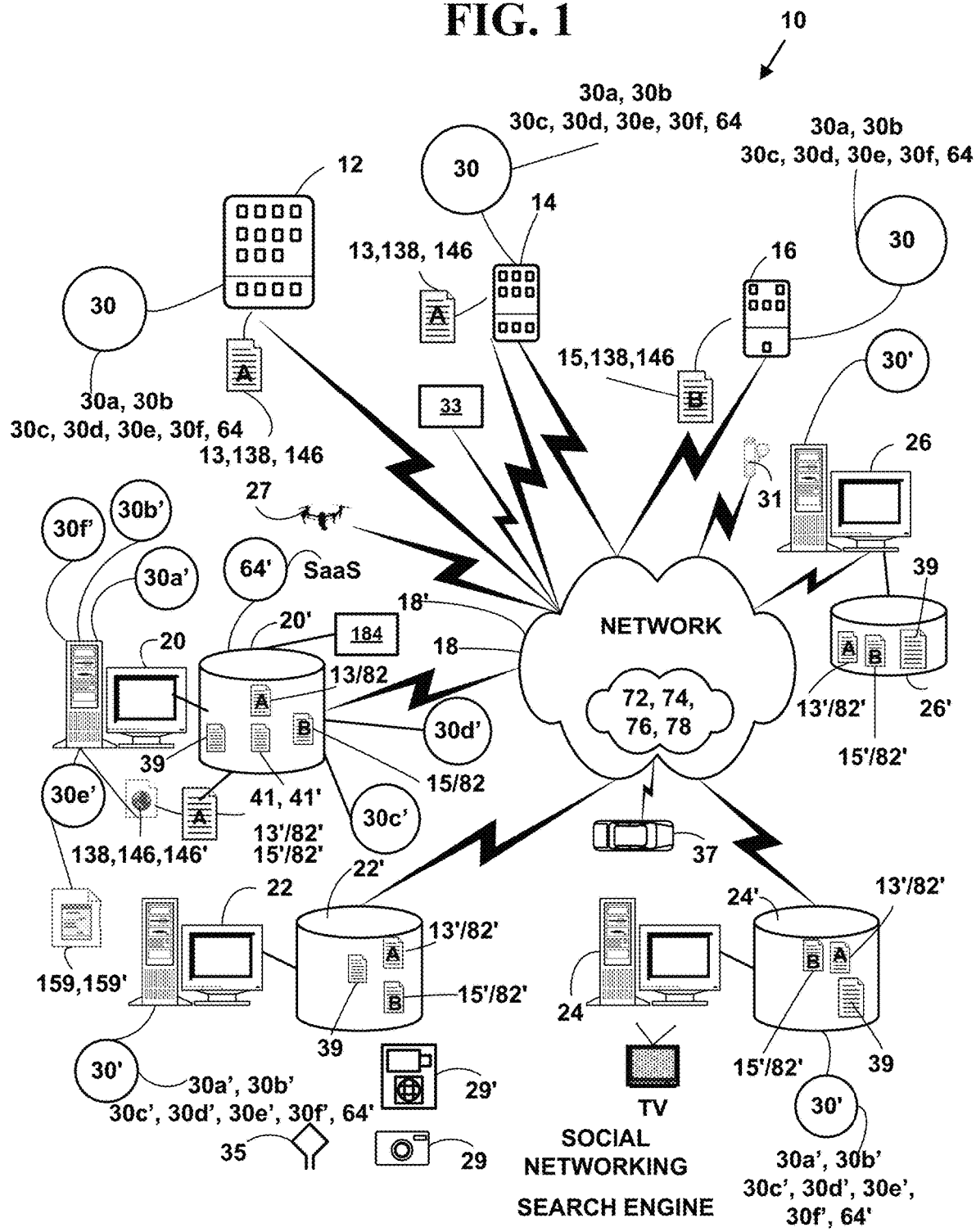
FIG. 1 is a block diagram illustrating an exemplary energy audit processing and display system.

FIG. 1 is a block diagram illustrating an exemplary electronic energy audit and energy retrofit project processing and display system 10. The exemplary electronic system 10 includes, but is not limited to, one or more target network devices 12, 14, 16, etc. each with one or more processors and each with a non-transitory computer readable medium.

The one or more target network devices 12, 14, 16 (illustrated in FIG. 1 only as a tablet and two smart phones for simplicity) include, but are not limited to, desktop and laptop computers, electronic tablets, surface computers (i.e., a computer that interacts with a user through the surface of an ordinary object, rather than through a monitor, keyboard, mouse, or other physical hardware, etc.) mobile phones, non-mobile phones with displays, three-dimensional (3D) printers, smart phones, Internet phones, Internet appliances, personal digital/data assistants (PDA), portable, handheld and desktop video game devices, unmanned aerial vehicles (UAVs) 27 with camera components, cameras 29, 360-degree cameras 29', smart speakers 31, Internet of Things (IoT) devices 33, Light Detection and Ranging (LIDR) devices 35, electric vehicles (EV) including, driverless vehicles 37 with camera components, cable television (CATV), satellite television (SATV) and Internet television set-top boxes, digital televisions including high definition television (HDTV), three-dimensional (3DTV) televisions, wearable network devices 98-104 (FIG. 6), and/or other types of network devices.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., MICROSOFT SURFACE, etc.

An unmanned aerial vehicle (UAV) 27, commonly known as a "drone" and also referred to as a "Remotely Piloted Aircraft (RPA)" by the International Civil Aviation Organization (ICAO), is an aircraft without a human pilot aboard. There are different kind of drones 123 including: (1) UAS (Unmanned Air System); (2) UAV (Unmanned Aerial Vehicle); (3) RPAS (Remote Piloted Aircraft Systems) and (4) Model Aircraft. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs 27 were simple remotely piloted aircraft, but autonomous control is increasingly being employed.

The use of UAVs 27 are characterized by altitudes of flights. The following types of UAVs 27 fly at different altitudes, broadly characterized as: (1) Very high altitude (VHA): above 45,000 feet (more than 12 km); (2) High altitude (HA): from 20,000 to 45,000 feet (6 to 12 km); (3) Medium altitude (MA): from 10 to 20,000 feet (3 to 6 km); or (4) Low altitude (LA): between a few hundred and up to 10,000 feet (1 to 3 km).

The specific needs of UAV 27 include required UAV 123 capabilities to allow them to fly in "non-segregated" air-traffic controlled airspace. The requirements placed on mobile links to and from a UAV 27 are required in terms of aeronautical safety due to the fact that these vehicles are unmanned. An air-traffic control (ATC) link includes full automation of communications between on-board and ground systems. A remote pilot (RP) link places additional and more strenuous constraints on the radio communication bearer(s) and systems used in, not necessarily significant as regards the amount of volume of data to be exchanged, in as much as UAV 27 generally possess or will possess their own computerized autonomous flight management system, limiting the remote pilot (RP) interventions to that of supervising and/or re-establishing flight procedures or choosing the most appropriate one, should any contingency arise.

The UAV 27 communicates on Aeronautical Mobile Service (AMS) wireless frequency including, but not limited to: (a) 4400-4940 MHz; (b) 5030 (or 5010)-5090 MHz, (MLS "core" band; (c) 5090-5150 MHz ("MLS" extension band); (d) 5150-5250 MHz; (e) 5925-6700 MHz; (f) 22.5-23.6 GHz; (g) 24.75-25.5 GHz; or (h) 27-27.5 GHz.

Most UAVs 27 have camera components, microphones and other audiovisual equipment that are used to view and collect information objects of interest from the air. The audiovisual signals are typically sent from the UAV's 27 to a remote control center for viewing by an operator.

A 360-degree camera 29' also called an omnidirectional camera, is a camera having a field of view that covers approximately the entire sphere or at least a full circle in the horizontal plane. 360-cameras 29' are use in areas where large visual field coverage is needed, such as in panoramic photography.

A smart speaker 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices 33, include but are not limited to, cameras 29, 360-degree cameras 29', LIDAR devices, 35, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices.

The LIDAR devices 35, include but are not limited to, standalone LIDAR devices and/or LIDAR components with LIDAR applications used on a smart phone 14, electronic tablets 12, surface computers, etc. LIDAR is a method for measuring distances by illuminating a target with laser light and measuring a reflection with a sensor. Differences in laser return times and wavelengths are then used to make digital 3-D representations of a target.

An electric vehicle (EV) including a driverless vehicle 37, or self-driving car, also known as an autonomous vehicle, connected and autonomous vehicle, driverless car, robo-car, or robotic car, is a vehicle that is capable of sensing its environment and moving safely with little or no human input.

The target network devices 12, 14, 16, 27, 29, 27, 29, 31, 33, 35, 37, 98-104 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16, 27, 29, 27, 29, 31, 33, 35, 37, 98-104 make requests for electronic content 13, 15, 13'/82, 15'/82, 138, 146, 146' via the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 27, 29, 27, 29, 31, 33, 35, 37, 98-104 via the cloud communications network 18 and non-cloud communications network 18'.

Plural server network devices 20, 22, 24, 26 (only four of which are illustrated) are physically located on one or more public networks 76 (See FIG. 4), private networks 72, community networks 74 and/or hybrid networks 78 comprising the cloud network 18.

One or more server network devices (e.g., 20, 22, 24, 26, etc.) store portions 13', 15' of the electronic content 13, 15, 138, 146, 146', 159 (e.g., energy audit data, energy retrofit project data, etc.) as cloud storage objects 82 (FIG. 5) as is described herein.

The plural server network devices 20, 22, 24 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
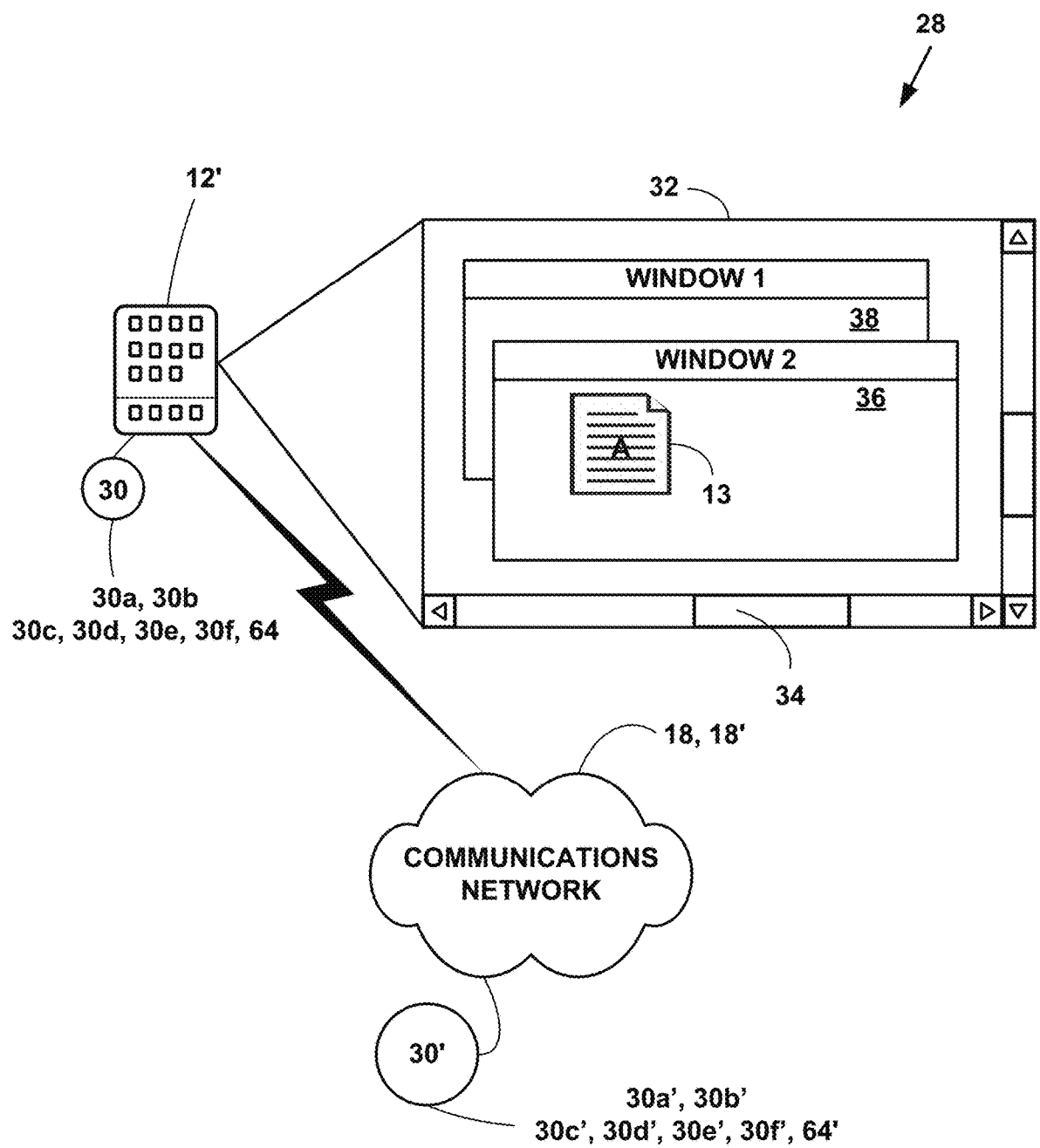
FIG. 2 is a block diagram illustrating an exemplary energy audit display system.

FIG. 2 is a block diagram illustrating an exemplary electronic energy project information display system 28. The exemplary electronic message information display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application 30*a*, 30*b*, 30*c*, 30*d*, 30*e*, 30*f* includes a cloud application used on a cloud communications network 18. However, the present invention is not limited these embodiments and other embodiments can be used to practice the invention In another embodiment, a portion of the application 30 is executing on the target network devices 12, 14, 16, 27, 29, 27, 29, 31, 33, 35, 37, 98-104 and another portion of the application 30*a'*, 30*b'*, 30*c'*, 30*d'*, 30*e'* 30*f* is executing on the server network devices 20, 22, 24, 26. The applications also include one or more library applications. However, the present invention is not limited these embodiments and other embodiments can be used to practice the invention.

Exemplary Networking Protocol Stack

Figure 3:
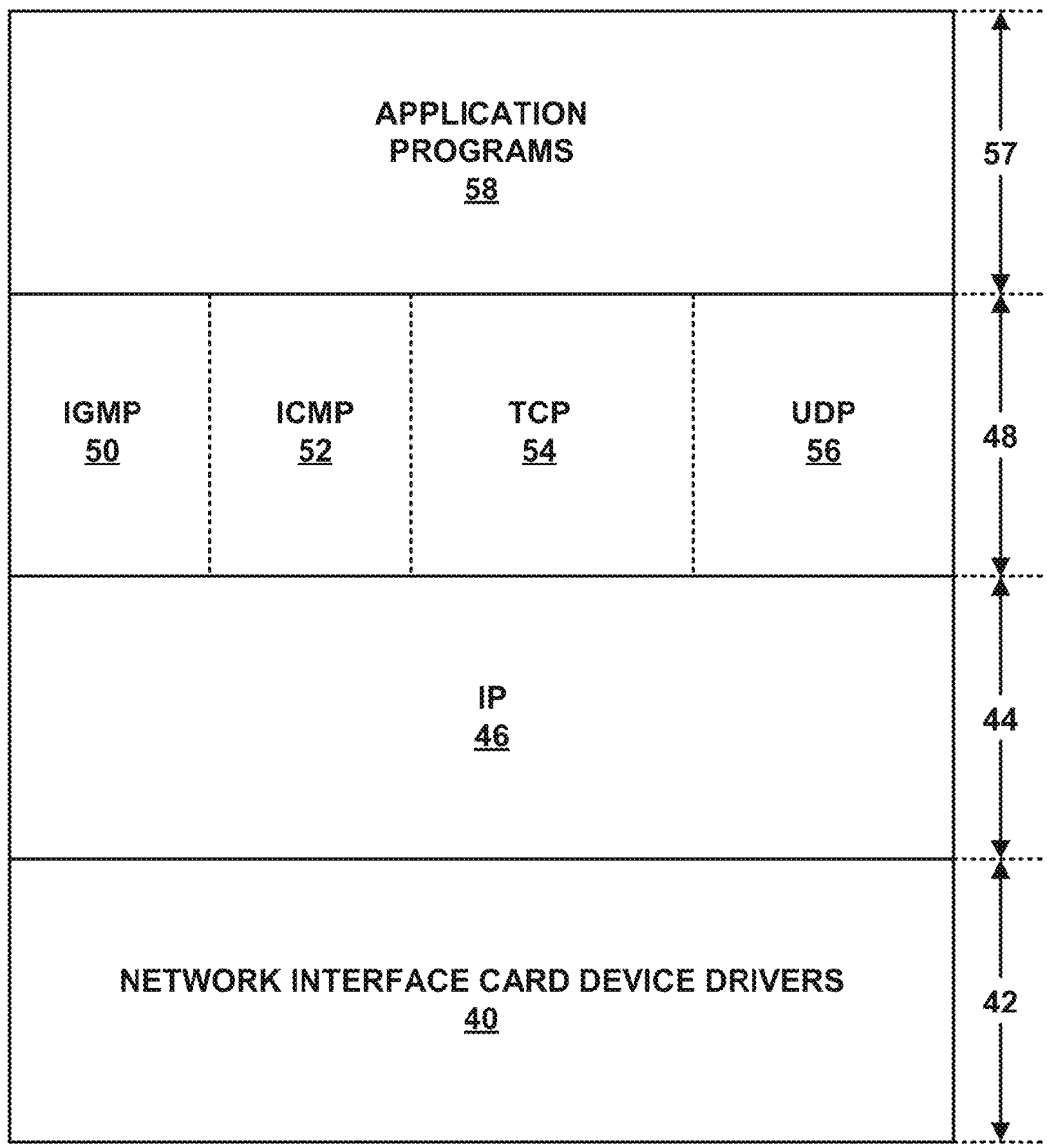
FIG. 3 is a block diagram illustrating an exemplary networking protocol stack.

FIG. 3 a block diagram illustrating a layered protocol stack 38 for network devices in the electronic message information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26, 27, 29, 27, 29, 31, 33, 35, 37, 98-104 are connected to the communication network 18 with Network Interface Card (NIC) cards including device drivers 40 in a link layer 42 for the actual hardware connecting the network devices 12, 14, 16, 20, 22, 24, 26, 27, 29, 27, 29, 31, 33, 35, 37, 98-104 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30a, 30b, 30c, 30d, 30e, 30f etc.) to carry out desired functionality for a network device reside. For example, the application programs 58 for the client network devices 12, 14, 16, 27, 29, 27, 29, 31, 33, 35, 37, 98-104 may include web-browsers or other application programs, application program 30, while application programs for the server network devices 20, 22, 24, 26 may include other application programs (e.g., 30a, 30b, 30c, 30d, 30e, 30f, etc.).

In one embodiment, the application layer 57 includes Java, Javascdrip and/or JavaScript Object Notation (JSON), etc. JSON is a lightweight data-interchange format that is easy for humans to read and write.

In one embodiment, application program 30 includes an Energy Audit, application 30a, an Energy Audit offline functionality application 30b, an Artificial Intelligence (AI) application 30c and/or energy project retrofit management application 30e and/or server energy project retrofit management application 30e', an electrification application 30f and/or server electrification project management application 30f. The AI application 30c is used with and/or without Big Data. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum, Java Forum, Javascript Forum, etc.

Wireless Interfaces

In one embodiment of the present invention, the wireless interfaces on network devices 12, 14, 16, 20, 22, 24, 26, 29, 27, 29, 31, 33, 35, 37, 98-104 include but are not limited to, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 27, 29, 27, 29, 31, 33, 35, 37, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 27, 29, 27, 29, 31, 33, 35, 37, 98-104, server network devices 20, 22, 24, 26, etc.).

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 27, 29, 27, 29, 31, 33, 35, 37, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30a, 30b, 30c, 30d, 30e, 30f provide cloud SaaS 64, 64' services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30a, 30b, 30c, 30d, 30e, 30f provide cloud SaaS 64, 64' services and/or non-cloud application services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30a, 30b, 30c, 30d, 30e, 30f provide cloud SaaS 64, 64' services and/or non-cloud application services from general search engine and private and/or propriety search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30a, 30b, 30c, 30d, 30e, 30f provide cloud SaaS 64, 64' services and/or non-cloud application services from general search engine services. In another embodiment, the cloud applications 30, 30a, 30b, 30c, 30d, 30e, 30f provide general search engine services by interacting with one or more other public search engines (e.g., GOOGLE, BING, YAHOO, etc.) and/or private search engine services.

In another embodiment, the cloud applications 30, 30a, 30b, 30c, 30d, 30e, 30f, provide cloud SaaS 64, 64' services and/or non-cloud application services from specialized search engine services, such as vertical search engine services by interacting with one or more other public vertical search engines and/or private search engine services.

However, the present invention is not limited to such general and/or vertical search engine services and more, fewer and/or other general search engine services can be used to practice the invention.

Social Networking Services

In one embodiment, the cloud applications 30, 30a, 30b, 30c, 30d, 30e, 30f, provide cloud SaaS 64, 64' services and/or non-cloud application services from one or more social networking services including to/from one or more social networking web-sites (e.g., FACEBOOK, YOUTUBE, TWITTER, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 27, 29, 27, 29, 31, 33, 35, 37, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30a, 30b, 30c, 30d, 30e, 30f. Security and/or encryption programs may also exist in hardware components on the network devices (12, 14, 16, 20, 22, 24, 26, 27, 29, 27, 29, 31, 33, 35, 37, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

WEP is used at the two lowest layers of the OSI model, the physical layer and the data link layer, therefore, it typically does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length$<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
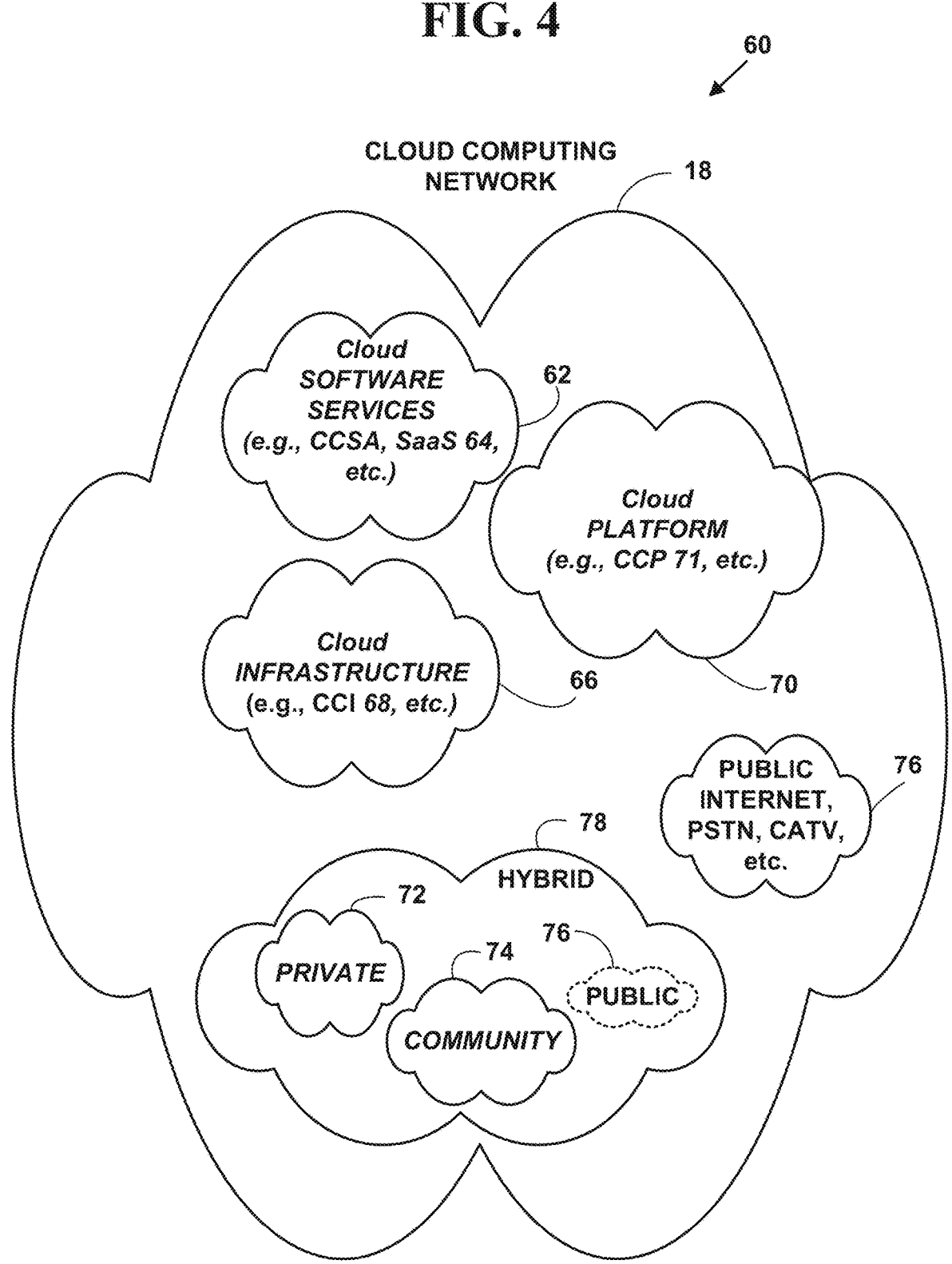
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand Energy Audit and Energy Retrofit Project, Installation, Tracking, Inspection and Verification Services. Automatic Electrocution Project, Installation, Tracking, Inspection and Verification Services can unilaterally provision computing capabilities, such as server time and network storage, as needed automatically without requiring human interaction with each network server on the cloud communications network 18. Such services include, but are not limited to, Javascript, JavaScript Object Notation (JSON), etc. services.
2. Broadband network access. Automatic Electrocution Project, Installation, Tracking, Inspection and Verification Services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access.
3. Resource pooling. Automatic Electrocution Project, Installation, Tracking, Inspection and Verification Services resources are pooled to serve multiple requesters using a multi-tenant model, with different physical and virtual resources dynamically assigned and reassigned according to demand. There is location independence in that a requester of services has no control and/or knowledge over the exact location of the provided by the Automatic Electrocution Project, Installation, Tracking, Inspection and Verification Service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for Electrocution Project, Installation, Tracking, Inspection and Verification Service collaboration. For Automatic Electrocution Project, Installation, Tracking, Inspection and Verification Services, multi-media collaboration converters, the automatic Electrocution Project, Installation, Tracking, Inspection and Verification Services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of automatic Electrocution Project, Installation, Tracking, Inspection and Verification Services (e.g., storage, processing, bandwidth, custom electronic content retrieval applications, etc.). Electronic Automatic Electrocution Project, Installation, Tracking, Inspection and Verification Services TABLE 1-continued interoperability services collaboration conversion usage is monitored, controlled, and reported providing transparency for both the automatic Electrocution Project, Installation, Tracking, Inspection and Verification Services provider and the Automatic Electrocution Project, Installation, Tracking, Inspection and Verification Service requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for Electrocution Project, Installation, Tracking, Inspection and Verification Services (CCSA, SaaS 64, 64'). The capability to use the provider's applications 30, 30a, 30b, 30c, 30d, 30e, 30f running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d, 30e, 30f, capabilities, with the possible exception of limited user-specific application configuration settings. The SaaS 64 includes a network device component for interacting with the SaaS 64' provided by a cloud server network device 20, 22, 24, 26.
2. Cloud Computing Infrastructure 66 for Electrocution Project, Installation, Tracking, Inspection and Verification Services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d 30e, 30f. The user does not manage or control the underlying cloud infrastructure 66 but may and/or may not have control over operating systems, storage, deployed applications, and possibly limited control of select networking components (e.g., application layers, host firewalls, etc.).
3. Cloud Computing Platform 70 for Electrocution Project, Installation, Tracking, Inspection and Verification Services (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30a, 30b, 30c, 30d, 30e, 30f and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for Electrocution Project Project, Installation, Tracking, Inspection and Verification. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique TABLE 3-continued entities but are bound together by standardized or proprietary technology that enables data and application portability (e.g., cloud bursting for load-balancing between clouds, etc.)

Cloud software 64, 64' for electronic content retrieval takes full advantage of the cloud paradigm by being service oriented with a focus on statelessness, low coupling, modularity, and semantic interoperability for electronic content retrieval. However, cloud software services 64, 64' can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30a, 30b, 30c, 30d, 30', 30a', 30b', 30c', 30d', 30e' 30f offers cloud services for Electrocution Project Installation, Tracking, Inspection and Verification. The application 30, 30a, 30b, 30c, 30d, 30', 30a', 30b', 30c', 30d', 30e', 30f offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64, 64' for automatic Electrocution Project, Installation, Tracking, Inspection and Verification services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
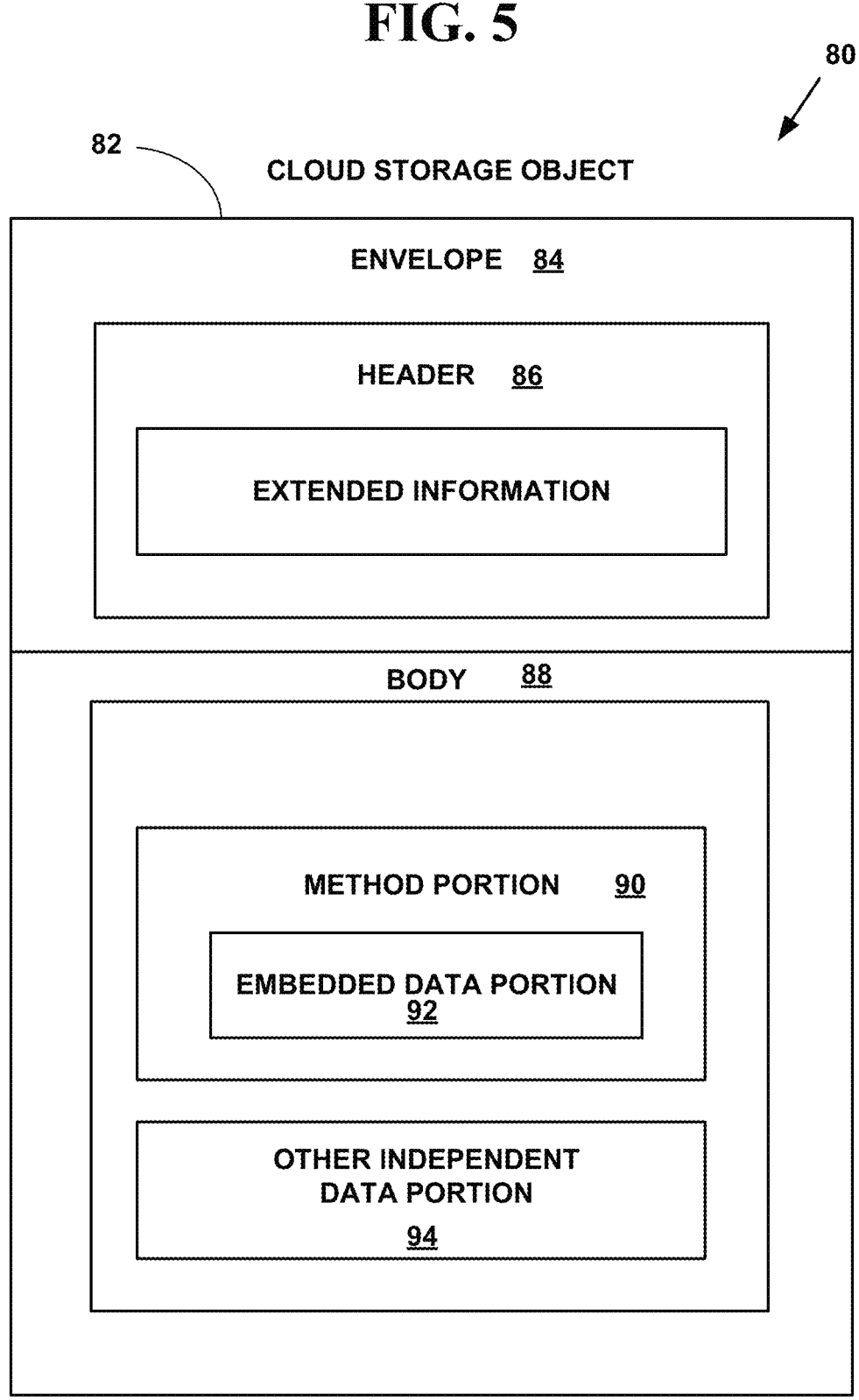
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the electronic content 13, 15, 138, 146, 146' as cloud storage objects 82 (FIG. 5) 13'/82, 15'/82 as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30a, 30b, 30c, 30d.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic Electrification Project, Installation, Tracking, Inspection and Verification Services in a cloud or non-cloud environment. In one embodiment, the API for Electrification Project services is available to network devices 12, 14, 16, 20, 22, 24, 26, 27, 29, 27, 29, 31, 33, 35, 37, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
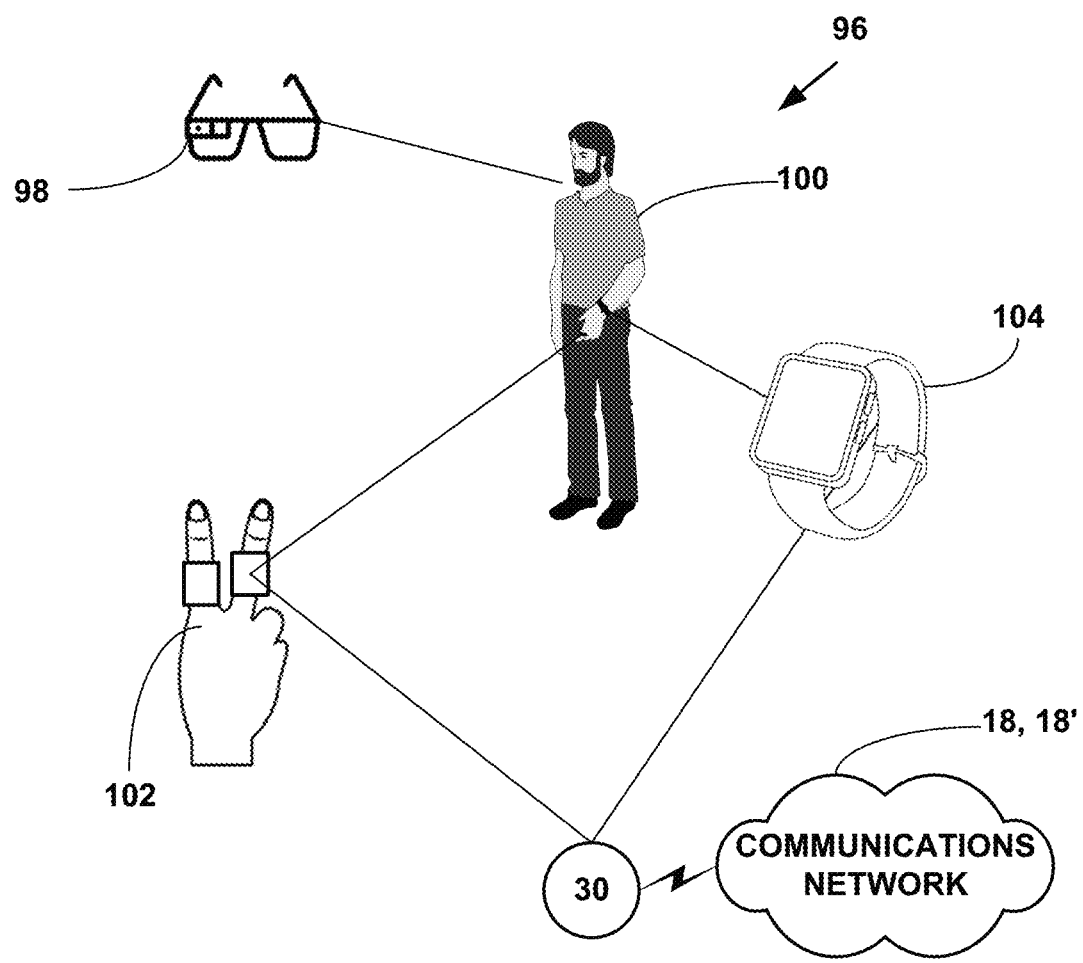
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30a, 30b, 30c, 30d, 30e interacts with wearable devices 98-104 automatic Electrification Project, Installation, Tracking, Inspection and Verification Services the methods described herein However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30c for Electrification Project, Installation, Tracking, Inspection and Verification Services and Managing and Providing Materials and Services for Energy Audits and Energy Retrofit Projects, Pricing, Dynamic Pricing and/or Pricing Analysis. However, the present invention is not limited to such an embodiment and more, fewer and/or other AI methods can be used to practice the invention.

In one embodiment, SaaS 64, 64' and 30e', 30f includes and AI application 30c with the AI methods described herein. In another embodiment, the AI application 30c is a standalone application. However, the present invention is not limited to such an embodiment, and the AI application 30c can be provided in other than the SaaS 64, 64'.

"Big Data" refers to the use of predictive analytic methods that extract value from data, and to a particular size of data set. The quantities of data used are very large, at least 100,000 data points and more typically 500,000 to 1 Million+data points. Analysis of Big Data sets are used to find new correlations and to spot trends. In one embodiment, SaaS 64, 64' includes and Big Data application with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

In one embodiment, the AI methods include predictive analysis methods. "Predictive analysis" is an AI method that uses data mining, statistics, and modelling to make predictions. This AI method mines and analyses historical data patterns to predict future outcomes by extracting information from data sets including Big Data sets to determine patterns and trends. For example, energy consuming component-X manufactured by company-Y consumes 10% more energy than energy consuming component-A manufactured by company-B, energy consuming component-C burns out 15% faster than energy consuming component-D, etc. However, the present invention is not limited to such embodiments and other AI methods can be used to practice the invention.

In one embodiment, the AI methods include "prescriptive analysis" methods. Prescriptive analysis focuses on finding a best course of action in a given scenario, given the available data. Prescriptive analysis gathers data from a variety of both descriptive and predictive sources for its AI models and applies them to a process of decision-making. However, the present invention is not limited to such embodiments and other AI methods can be used to practice the invention.

In another embodiment, the AI methods include anomaly detection. "Anomaly detection" AI methods analyzes data, including Big Data and pinpoints anything out of usual operations or usual expectations. For example, energy consuming component-E manufactured by company-F in batch-XYZ, fails 60% of the time within one month after installation, etc. However, the present invention is not limited to such embodiments and other AI methods can be used to practice the invention.

In another embodiment, the AI methods include clustering analysis. "Clustering analysis" AI methods include dividing a population or data points or Big Data points into a number of groups such that data points in the same groups are more similar to other data points in the same group and dissimilar to the data points in other groups. It includes a collection of objects on a basis of similarity and dissimilarity between them. For example, energy consuming component-LED-1 manufactured by companies G, H and I, consume 5% less energy than energy consuming component LED-2 manufactures by companies J, K and L, etc. However, the present invention is not limited to such embodiments and other AI methods can be used to practice the invention.

In another embodiment, the AI methods include predictive analysis, prescriptive analysis, anomaly detection and/or clustering analysis and/or a combination thereof. However, the present invention is not limited to such embodiments and other AI methods can be used to practice the invention.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Rich Communication Suite (RCS)

Rich Communications Suite/Rich Communications System (RCS) is a communication protocol between mobile telephone carriers, between phones and carriers, and between individual devices aiming at replacing SMS messages with a message system that is richer, provides phonebook polling (e.g., for service discovery, etc.), and can transmit in-call multimedia. It is also marketed under the names of Advanced Messaging, Advanced Communications, Chat, joyn, Message+ and SMS+. RCS is also a communication protocol available for device-to-device (D2D) exchanges without using a telecommunications carrier for devices that are in close physical proximity (e.g., between two IoT devices, smart phones, smart phone and electronic tablet, etc.)

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P), application-to-person (A2P), application-to-application (A2A), application-to-device (A2D) and/or device-to-device (D2D) messaging.

The RCS Interworking Guidelines Version 14.0, 13 Oct. 2017, GSM Association, Rich Communication Suite RCS API Detailed Requirements, version 3.0, Oct. 19, 2017, Rich Communication Suite 8.0 Advanced Communications Services and Client Specification Version 9.0, 16 May 2018, RCS Universal Profile Service Definition Document Version 2.2, 16 May 2018, and Rich Communication Suite Endorsement of OMA CPM 2.2 Conversation Functions Version 9.0, 16 Oct. 2019, are all incorporated herein by reference.

The Rich Communication Suite-Enhanced (RCS-e) includes methods of providing first stage interoperability among Mobile Network Operators (MNOs). RCS-e is a later version of RCS which enables mobile phone end users to use instant messaging (IM), live video sharing and file transfer across any device on any MNO.

The RCS functionality of the present invention includes, but is not limited to, one and two way, rich, verified, multimedia messages including photos, videos and audio messages, group messages, read receipts, indicators to show other users are typing a message, predefined quick-reply suggestions, rich cards, carousels, action buttons, maps, click-to-call, calendar integration, geo-location, etc. The RCS functionality also includes RCS emulators and/or thin RCS applications that provide full and/or selected features of available RCS functionality.

Energy Audit, Installation, Tracking, Inspection and Verification Services

FIGS. 7A, 7B and 7C are a flow diagram illustrating a Method 106 for energy audit installation, tracking, inspection and verification services. In FIG. 7A at Step 108, an electronic floorplan of a building for conducting an energy audit of energy consuming components is provided on an energy audit application on network device with one or more processors, a non-transitory computer readable medium and a communications interface for connecting the network device to a communications network. At Step 110, a configurable electronic template is provided on energy audit application the network device for conducting the energy audit of the energy consuming components, the configurable electronic template dynamically configurable during the energy audit. At Step 112, the network device is moved physically into the building to plural different physical locations within the building, the network device is not connected to the communication network within the building and a selected physical location of the network device in the building corresponds to a selected virtual location on the electronic floorplan for the building. At Step 114, a creation selection input is received on on the energy audit application on the network device to create a graphical marker for a selected energy consuming component at a specific location on the electronic floorplan of the building. At Step 116, a graphical marker is displayed in a first color on the energy audit application on the network component at the specific location on the electronic floorplan of the building for the selected energy consuming component. In FIG. 7B at Step 118, plural collection selection inputs are received on the energy audit application on network device including: (a) audio information from an audio component on the network device (b) visual information from a camera component on the network device, and (c) electronic information from an electronic keyboard component on the network device, the audio, visual and electronic information including information collected for the selected energy consuming component at the specific location on the electronic floorplan of the building. At Step 120, the received audio, visual and electronic information is stored in the configurable electronic template on the energy audit application on network device. At Step 122, steps 114 through 120 are repeated for plural of other selected energy consuming components at plural other specific locations on the electronic floorplan of the building. At Step 124, an energy audit summary report is created on the energy audit application on the network device with the stored audio, visual and electronic information. The energy audit summary report is dynamically updated on the energy audit application on the network device as energy consuming components are identified in the building. In FIG. 7C at Step 126, the network device is moved to a new physical location inside or outside of the building that allows the network device to connect to the communications network via the communications interface on the network device. At Step 128, the energy audit application on the network device connects via the communications interface on the network device to a server energy audit application on a server network device with one or more processor via the communications network. At Step 130, the data stored on the energy audit application on network device is automatically synchronized with the server energy audit application on the server network device, thereby allowing energy audit information for the electronic floorplan of the building to be identical on the network device and the server network device.

Figure 8:
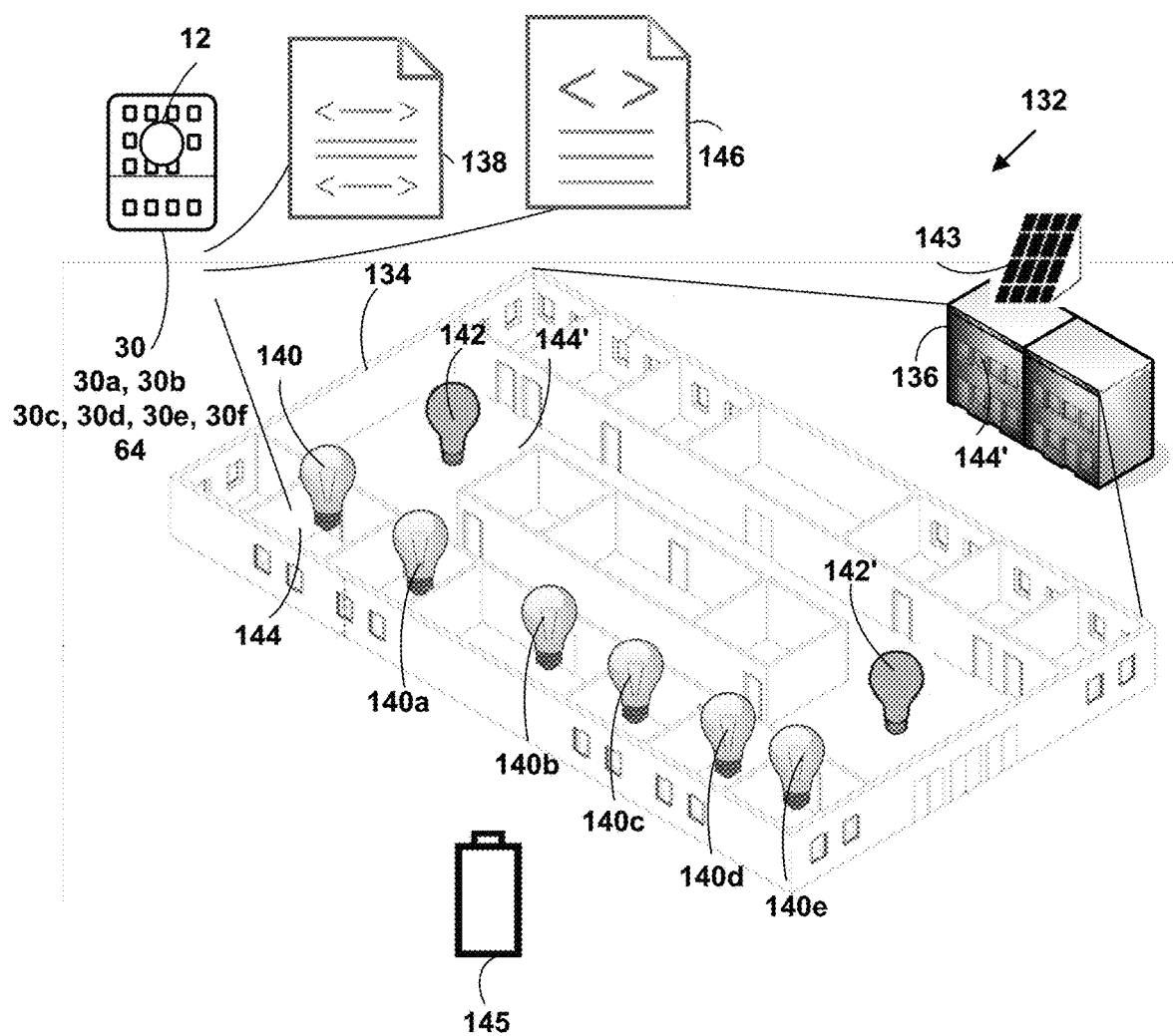
FIG. 8 is a block diagram illustrating components of energy audits.

FIG. 8 is a block diagram 132 illustrating components of energy audits. The energy audit components include an electronic floor plan 134 for a building 136, a configurable electronic template 138, energy consuming components 140, 142, energy producing components 143 (only one illustrated, a solar panel, etc. for simplicity, etc.) and location 144.

Figure 7:
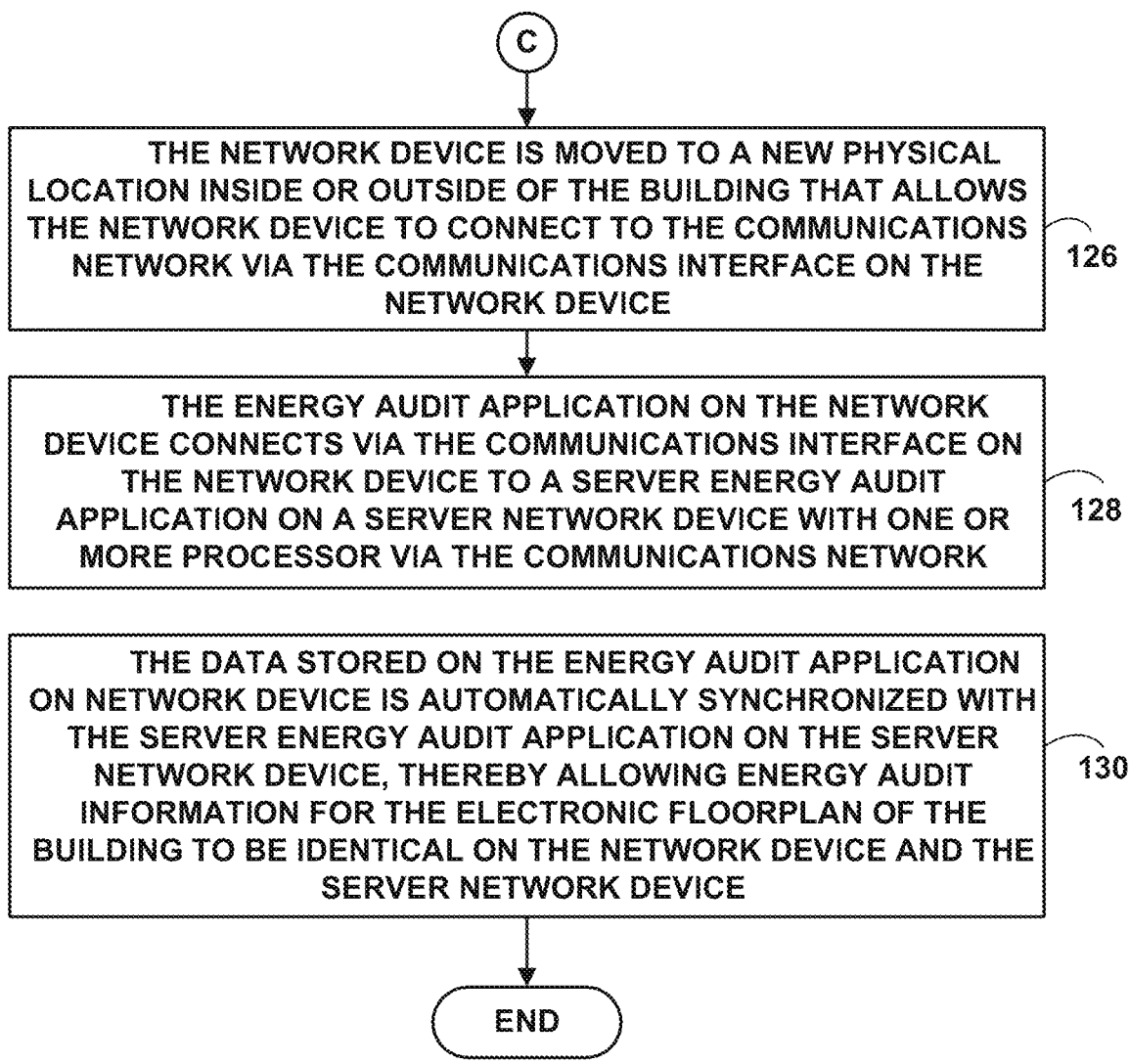
FIGS. 7A, 7B and 7C are a flow diagram illustrating a method for energy audit installation, tracking, inspection and verification services.

In FIG. 7, Method 106 is illustrated with an illustrative embodiment. However the present invention is not limited to this illustrative embodiment and other embodiments can be used to practice the invention.

In such an illustrative embodiment in FIG. 7A at Step 108, an electronic floorplan 13, 134 of a building for conducting an energy audit of energy consuming components is provided on an energy audit application 30, 30a, 30b, 30c, 30d, 64 (SaaS 64 when online) on network device 12, 14, 16, 27, 29, 27, 29, 31, 33, 35, 37, 98-104 with one or more processors, a non-transitory computer readable medium and a communications interface for connecting the network device to a communications network 18, 18'.

In one embodiment, the electronic floorplan of the building is created with a Computer Aided Design (CAD), Building Information Modeling (BIM) program, 3D modeling program and/or other design program. However, the present invention is not limited to such embodiments and other program can be used to create electronic floor plans 134 of a building 136.

For example, the BIM and/or 3D modeling programs, include, but are not limited to, AUTODESK REVIT, AUTODESK INVENTOR, AUTOCAD, SKETCHUP, VECTORWORKS, MICROSTATION, ARCHICAD, SOLIDWORKS, PROE, AGI32, etc. However, the present invention is not limited to such embodiments and other embodiment can be used to practice the invention.

In one embodiment, the energy consuming components include, but are not limited to, lighting, heating, ventilation, air conditioning, motors, variable frequency drives, transformers, generators and/or combinations thereof. However, the present invention is not limited so such embodiments and any other energy consuming components can be used to practice the invention.

At Step 110, a configurable electronic template 138 is provided on energy audit application 30, 30a, 30b, 30c, 30d, 64 the network device 12, 14, 16, 27, 29, 27, 29, 31, 33, 35, 37, 98-104 for conducting the energy audit of the energy consuming components 140, 142, the configurable electronic template 138 dynamically configurable during the energy audit.

In one embodiment, the energy audit application 30, 30a, 30b, 30c, 30d, 64 the network device 12, 14, 16, 27, 29, 27, 29, 31, 33, 35, 37, 98-104 includes a template wizard to assist in creating plural data fields in configurable electronic template 138. In such an embodiment, the template wizard provides assistance by presenting questions (e.g., "what type of lighting are you auditing? (1) incandescent, (2) florescent, (3) LED?", etc.) and then automatically creating appropriate data fields in the configurable electronic template 138. However, the present invention is not limited to such an embodiment and the invention can be practiced with and/out a template wizard.

For example, the configurable electronic template 138 may be configured to collect information on florescent lights with data fields including light bulb length, brand, ballast, starter, diffusers, cover types, etc. as a building 136 may include a majority of florescent lights. During the energy audit, it is decided to collect lumen values for all the florescent lights, so a lumen data field is dynamically added to the configurable electronic template 138. Then during an energy audit several store rooms with incandescent lights are encountered. The configurable electronic template 138 is dynamically configurable to add additional fields for the incandescent lights. However, the present invention is not limited to such an embodiment and other embodiment can be used to practice the invention.

At Step 112, the network device 12, 14, 16, 27, 29, 27, 29, 31, 33, 35, 37, 98-104 is moved physically into the building 136 to plural different physical locations within the building, the network device 12, 14, 16, 27, 29, 27, 29, 31, 33, 35, 37, 98-104 is not connected to the communication network 18, 18' within the building 136 (i.e., is offline, etc.) and a selected physical location 144 of the network device 12 in the building 136 corresponds to a selected virtual location 144' on the electronic floorplan 13, 134 for the building 136.

In one embodiment, the network device 12, 14, 16, 27, 29, 27, 29, 31, 33, 35, 37, 98-104 must work offline because the building 136 includes a large amount of concrete, steel or other building materials that interfere or prevent the network device 12, 14, 16, 27, 29, 27, 29, 31, 33, 35, 37, 98-104 device from ever successfully connecting to a communications network 18, 18'. In addition, the network device 12, 14, 16, 27, 29, 27, 29, 31, 33, 35, 37, 98-104 may be physically located in a service closet, an attic, interior spaces of building, etc. that prevent successful connections to the communications network 18, 18'. The network device 12, 14, 16, 27, 29, 27, 29, 31, 33, 35, 37, 98-104 is able to work offline and complete all its desired tasks and automatically synchronize all energy audit data it has collected at a later time. Working offline also provides an additional advantage of not running down a battery on the network device 12, 14, 16, 27, 29, 27, 29, 31, 33, 35, 37, 98-104 that may be constantly trying to connect with the communications network 18, 18' without ever being successful because of its physical location inside the building 136.

At Step 114, a creation selection input is received on the energy audit application 30, 30a, 30b, 30c, 30d, 64 on the network device 12, 14, 16, 27, 29, 27, 29, 31, 33, 35, 37, 98-104 to create a graphical marker 140 for a selected energy consuming component at a specific location 144 on the electronic floorplan 134 of the building 136.

In one embodiment, the graphical marker includes a specific graphical marker representing and graphically illustrating a specific type of energy consuming component and/or specific type of energy producing component 143. However, the present invention is not limited to such embodiments and other embodiments can be used to practice the invention.

In one embodiment, energy audit application 30, 30a, 30b, 30c, 30d, 64 on the network device 12, 14, 16, 27, 29, 27, 29, 31, 33, 35, 37, 98-104 includes a graphical component fixture wizard with plural selectable graphical objects that visually identify a plural different energy consuming components and energy producing components 143 to ensure each energy consuming component and energy producing component 143 is fully defined and consistently identified on the electronic floorplan 134 of the building 136. However, the present invention is not limited to such embodiments and other embodiments can be used to practice the invention.

FIG. 8 illustrates the graphical marker 140 as a graphical light bulb for a incandescent lighting component for the selected energy consuming component. However, the present invention is not limited to this embodiment and other graphical markers can be used for lighting and for the selected energy consuming component.

Returning to FIG. 7A at Step 116, the graphical marker 140 is displayed in a first color (e.g., yellow, etc.) on the energy audit application 30, 30a, 30b, 30c, 30d, 64 on the network component 12 at the specific location 144 on the electronic floorplan 134 of the building 136 for the selected energy consuming component 140.

In FIG. 7B at Step 118, plural collection selection inputs are received on the energy audit application 30, 30a, 30b, 30c, 30d, 64 on network device 12, 14, 16, 27, 29, 27, 29, 31, 33, 35, 37, 98-104 including: (a) audio information from an audio component on the network device 12, 14, 16, 27, 29, 27, 29, 31, 33, 35, 37, 98-104, (b) visual information from a camera component 29, including but not limited to a 360-degree camera component 29' on the network device 12, 14, 16, 27, 29, 27, 29, 31, 33, 35, 37, 98-104, and (c) electronic information from an electronic keyboard component on the network device 12, 14, 16, 27, 29, 27, 29, 31, 33, 35, 37, 98-104, the audio, visual and electronic information including information collected for the selected energy consuming component 140 at the specific location 144 on the electronic floorplan 134 of the building 136.

In one embodiment, the audio information captured on the camera component on the network device includes, but is not limited to, voice recordings. However, the present invention is not limited to such an embodiment and other embodiments can be used to practice the invention.

In one embodiment, the visual information captured on the camera component on the network device includes, but is not limited to, still pictures, video and 360-degree view visual information. However, the present invention is not limited to such an embodiment and other embodiments can be used to practice the invention.

In one embodiment, the visual information includes still pictures and/or videos that include additional annotated and/or markup information for individual energy consuming components. For example, "this florescent light has the oldest starter in the building and needs to be replaced first," etc. However, the present invention is not limited to this embodiment and other embodiments can be used to practice the invention.

In another embodiment Step 118 further includes collecting audio, visual and electronic information from energy producing components 143 on an energy audit application 30, 30a, 30b, 30c, 30d, 64 on network device 12, 14, 16, 27, 29, 27, 29, 31, 33, 35, 37, 98-104. However, the present invention is not limited to this embodiment and other embodiments can be used to practice the invention.

In one embodiment, the energy producing components 143 include, but are not limited to, solar (e.g., solar panels, photovoltaic systems, etc.), wind (e.g., turbines, etc.), water (e.g., hydroelectric, etc.), biomass (e.g., algae, garbage, etc.) energy producing components 143 and combinations thereof. However, the present invention is not limited so such embodiments and any other energy producing components can be used to practice the invention.

In one embodiment, Step 118 further includes applying automatically one or more Artificial Intelligence (AI) methods to the audio, visual and electronic information collected for the selected energy consuming component 140 to provide additional information about the selected energy consuming component 140. In one embodiment, the AI methods include predictive analysis, anomaly detection and/or clustering analysis and/or a combination thereof. The AI methods are used with and/or without Big Data. However, the present invention is not limited to such embodiments and more, fewer and other AI methods can be used to practice the invention. In addition, the invention can be practice without using AI methods.

In one embodiment, the network device 12, 14, 16, 27, 29, 27, 29, 31, 33, 35, 37, 98-104 further includes one or more additional sensing components to measure: distance, location, energy output, light output, airflow, electrical input and output, water flow, pressure or temperature of the energy consuming components.

For example, a laser meter is used to measure distance, a Global Positioning System (GPS) component is used to measure location, electric meters to measure energy output and electrical input and output, a lumen meter to measure light output, an airflow meter to measure airflow, a water flow meter to measure water flow, a pressure meter to measure pressure, and/or a thermometer to measure temperature, etc. However, the present invention is not limited to such embodiments and other embodiment can be used to practice the invention.

The sensing components, include but are not limited to, additional components that are added to the network device and/or applications that using existing hardware on the network device 12, 14, 16, 27, 29, 27, 29, 31, 33, 35, 37, 98-104. However, the present invention is not limited to such embodiments and other embodiment can be used to practice the invention.

The additional sensing components are used to collect additional information about the energy consuming components for the energy audits. If an energy audit is being conducting on lighting components, a lumen meter is used to collect data from existing lighting components. A "lumen" is a unit of measurement for the brightness of light. A lumen is defined as "a unit of luminous flux equal to the amount of light given out through a solid angle of one steradian by a point source of one candela intensity radiating uniformly in all directions." Different types of lighting components provide light with different amounts of lumens while consuming different amounts of energy.

For example, a 10 watt Light Emitting Diode (LED) bulb emits about 800 lumens, cost about $1.34 per year to operate and has an average life span of about 25,000 hours. In stark contrast, a 10 watt florescent light bulb emits about 450 lumens, cost about $1.73 per year to operate and has an average life span of about 8000 hours. If a room has two florescent bulbs, they would provide about 900 lumens and cost about $3.46 per year to operate. Thus, the two florescent bulbs could be replaced with one LED bulb that generates a similar amount of lumens (800 vs. 900) and at a yearly cost savings of about $2.12 ($3.46–$1.34), etc. Collecting such additional information is very important if the energy audit is being using to replace and/or retrofit existing energy consuming components in a commercial or industrial building with a large amount of energy consuming components.

At Step 120, the received audio, visual and electronic information is stored in the configurable electronic template 138 on the energy audit application 30, 30a, 30b, 30c, 30d, 64 on network device 12, 14, 16, 27, 29, 27, 29, 31, 33, 35, 37, 98-104.

In one embodiment, the network device 12, 14, 16, 27, 29, 27, 29, 31, 33, 35, 37, 98-104 stores the received audio, visual and electronic information in one or more cloud storage objects 82 on a cloud communications network 18 when the network device 12, 14, 16, 27, 29, 27, 29, 31, 33, 35, 37, 98-104 later connects to the communications network 18' including a cloud communications network 18.

At Step 122, steps 114 through 120 are repeated for plural of other selected energy consuming components 140a-140e at plural other specific locations on the electronic floorplan 134 of the building 138.

One or more graphical markers are changed from the first color 140 (e.g., yellow, etc.) to a second color 142, 142' (e.g., green, etc.) on the energy audit application 30, 30a, 30b, 30c, 30d, 64 on the network device 12, 14, 16, 27, 29, 27, 29, 31, 33, 35, 37, 98-104 at selected specific locations 144' on the electronic floorplan 134 of the building 136 to visually indicate where information collection for selected energy consuming components has been completed.

A third color (e.g., red, etc.) is used on the on the energy audit application 30, 30a, 30b, 30c, 30d, 64 on the network device 12, 14, 16, 27, 29, 27, 29, 31, 33, 35, 37, 98-104 at selected specific locations 144' on the electronic floorplan 134 of the building 136 to visually indicate where no information collection for selected energy consuming components has been completed and/or there is some other type of issue or problem that has occurred and needs to be addressed.

At Step 124, an energy audit summary report 146 is created on the energy audit application 30, 30a, 30b, 30c, 30d, 64 on the network device 12, 14, 16, 27, 29, 27, 29, 31, 33, 35, 37, 98-104 with the stored audio, visual and electronic information. The energy audit summary report 146 is dynamically updated on the energy audit application 30, 30a, 30b, 30c, 30d on the network device 12, 14, 16, 27, 29, 27, 29, 31, 33, 35, 37, 98-104 as energy consuming components 140a-140e are identified in the building 136.

In FIG. 7C at Step 126, the network device 12, 14, 16, 27, 29, 27, 29, 31, 33, 35, 37, 98-104 is moved to a new physical location inside or outside of the building that allows the network device to connect to the communications network 18, 18' via the communications interface on the network device 12, 14, 16, 27, 29, 27, 29, 31, 33, 35, 37, 98-104 either with a wireless or wired connection.

At Step 128, the energy audit application 30, 30a, 30b, 30c, 30d, 64 on the network device 12, 14, 16, 27, 29, 27, 29, 31, 33, 35, 37, 98-104 connects via the communications interface on the network device 12, 14, 16, 27, 29, 27, 29, 31, 33, 35, 37, 98-104 to a server energy audit application 30', 30a', 30b', 30c', 30d', 64' on a server network device 20, 22, 24, 26 with one or more processor via the communications network 18, 18'.

At Step 130, the data stored 13, 15, 13'/82, 15'/82, 138, 146 on the energy audit application 30, 30a, 30b, 30c, 30d, 64 on the network device 12, 14, 16, 27, 29, 27, 29, 31, 33, 35, 37, 98-104 is automatically synchronized with the server energy audit application 30', 30a', 30b', 30c', 30d', 64' on the server network device 12, 14, 16, 27, 29, 27, 29, 31, 33, 35, 37, 98-104, thereby allowing energy audit information for the electronic floorplan 134 of the building 136 to be identical on the network device 12, 14, 16, 27, 29, 27, 29, 31, 33, 35, 37, 98-104 and the server network device 20, 22, 24, 26.

In one embodiment, energy audit information is collected on multiple network devices 12, 14, 16, 27, 29, 27, 29, 31, 33, 35, 37, 98-104 and at Step 130 the energy audit information from all the multiple network devices 12, 14, 16, 27, 29, 27, 29, 31, 33, 35, 37, 98-104 is automatically synchronized whenever the multiple network devices 12, 14, 16, 27, 29, 27, 29, 31, 33, 35, 37, 98-104 connect to the communications network 18, 18' and are in a connect (i.e., on-line) state.

In one embodiment, the server energy audit application 30', 30a', 30b', 30c', 30d', 64' on the server network device 20, 22, 24, 26 automatically applies one or more Artificial Intelligence (AI) methods to the audio, visual and electronic information collected for the selected energy consuming component 140 and the selected other plural energy consuming components 140a-140e, 142 to provide additional information the about plural selected energy consuming components 140, 140a-140e, 142. The AI methods are used with and/or without Big Data. However, the present invention is not limited to such embodiments and more, fewer and other AI methods can be used to practice the invention. In addition, the invention can be practice without using AI methods.

In one embodiment, the additional information about the plural selected energy consuming components 140a-140e, 142 includes one or more electronic links to one or more information sources including existing electronic product and price information about the existing plural selected energy consuming components 140a-140e, 142 and new electronic information and new price information for new energy consuming components that can replace the existing plural selected energy consuming components 140a-140e, 142 in the building 136.

For example Table 4 illustrates exemplary additional information that is available via the one or more electronic links (e.g., underlined in Table 4, etc.) for lighting components. Table 4 is exemplary only. The present invention is not limited to such embodiments and other embodiments can be used to practice the invention.

TABLE 4

| LED Bulbs | Compact Florescent Lamp (CFL) Bulbs | Incandescent Bulbs |
|---|---|---|
| Brightness: 10 W/800 Lumens | Brightness: 10 W/450 Lumens | Brightness: 10 W/80 Lumens |
| Operating Cost: $1.34 per year | Operating Cost: $1.73 per year | Operating Cost: $3.05 per year |
| Product Data Sheets | Product Data Sheets | Product Data Sheets |
| Energy Efficiency Data | Energy Efficiency Data | Energy Efficiency Data |
| Manufacturer: PHILLIPS CREE GENERAL ELECTRIC | Manufacturer: PHILLIPS CREE GENERAL ELECTRIC | Manufacturer: PHILLIPS CREE GENERAL ELECTRIC |
| Purchase: AMAZON.com LOWES.com HOME DEPOT.com | Purchase: AMAZON.com LOWES.com HOME DEPOT.com | Purchase: AMAZON.com LOWES.com HOME DEPOT.com |

Figure 9:
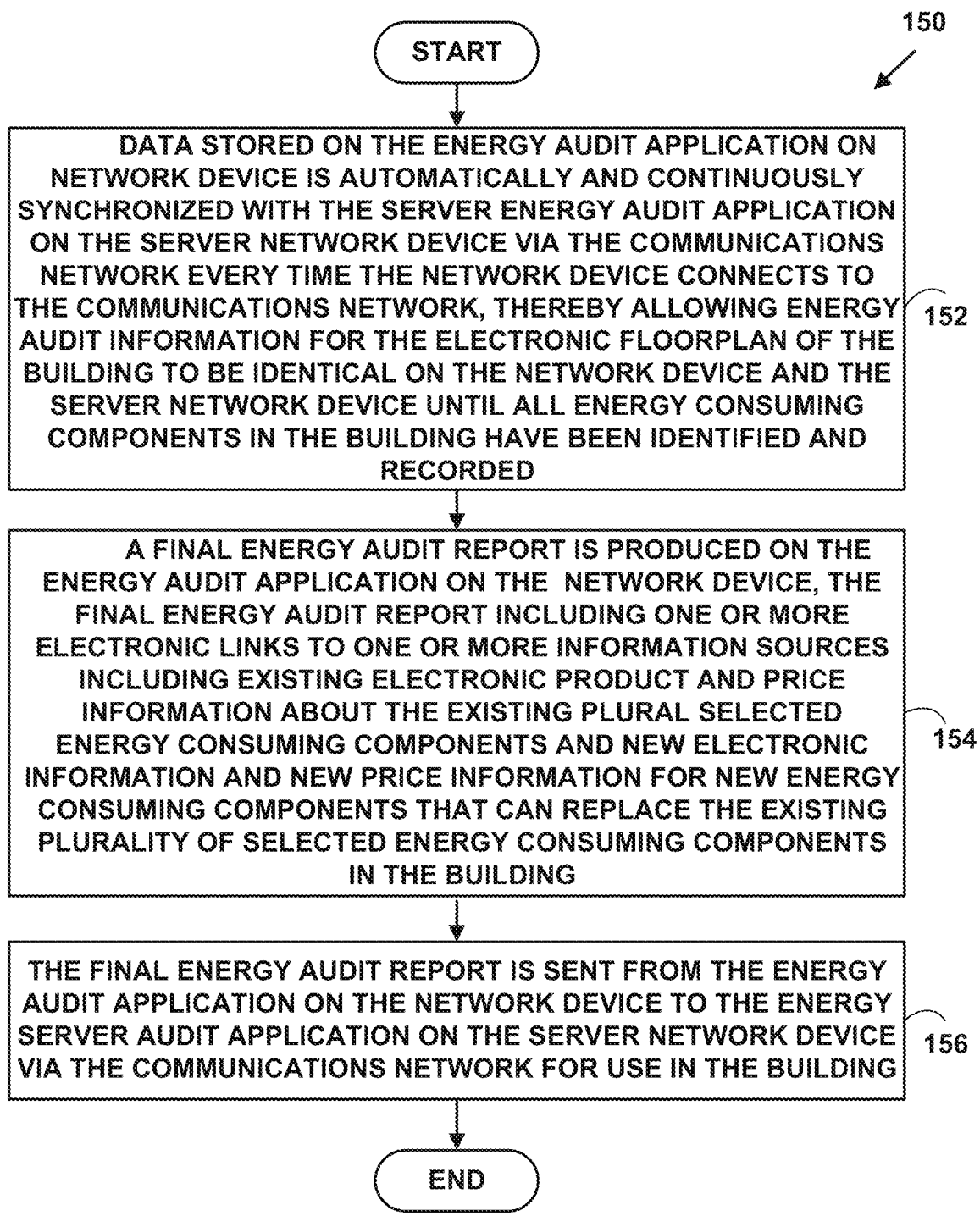
FIG. 9 is flow diagram illustrating a method for providing energy audits.

FIG. 9 is flow diagram illustrating a Method 150 for providing energy audits. At Step 152, data stored on an energy audit application on a network device is automatically and continuously synchronized with a server energy audit application on a server network device via a communications network every time the network device connects to the communications network, thereby allowing energy audit information, progress, verification, inspection for an electronic floorplan of a building to be identical on the network device and the server network device until all energy consuming components in the building have been identified and recorded. At Step 154, a final energy audit report is produced on the energy audit application on the network device, the final energy audit report including one or more electronic links to one or more information sources including existing electronic product and price information about the existing selected energy consuming components and new electronic information and new price information for new energy consuming components that can replace the existing selected energy consuming components in the building. At Step 156, the final energy audit report is sent from the energy audit application on the network device to the energy server audit application on the server network device via the communications network for use in the building.

Method 150 is illustrated with an illustrative embodiment. However the present invention is not limited to this illustrative embodiment and other embodiments can be used to practice the invention.

In such an illustrative embodiment in FIG. 9 at Step 152, data stored on an energy audit application 30, 30a, 30b, 30c, 30d, 64 on a network device 12, 14, 16, 27, 29, 27, 29, 31, 33, 35, 37, 98-104 is automatically and continuously synchronized with a server energy audit application 30', 30a', 30b', 30c', 30d', 64' on a server network device 20, 22, 24, 26 via a communications network 18, 18' every time the network device 12, 14, 16, 27, 29, 27, 29, 31, 33, 35, 37, 98-104 connects to the communications network 18, 18', thereby allowing energy audit information, progress, verification, inspection for the electronic floorplan 134 of the building 136 to be identical on the network device 12, 14, 16, 27, 29, 27, 29, 31, 33, 35, 37, 98-104 and the server network device 20, 22, 24, 26 until all energy consuming components in the building 136 have been identified and recorded.

At Step 154, a final energy audit report 146' is produced on the energy audit application 30, 30a, 30b, 30c, 30d, 64 on the network device 12, 14, 16, 27, 29, 27, 29, 31, 33, 35, 37, 98-104 the final energy audit report including one or more electronic links (e.g., Table 4, etc.) to one or more information sources including existing electronic product and price information about the existing plural selected energy consuming components and new electronic information and new price information for new energy consuming components that can replace the existing plural selected energy consuming components in the building 136.

At Step 156, the final energy audit report 146' is sent from the energy audit application 30, 30a, 30b, 30c, 30d, 64 on the network device 12, 14, 16, 27, 29, 27, 29, 31, 33, 35, 37, 98-104, to the server energy audit application 30', 30a', 30b', 30c', 30d', 64' on the server network device 20, 22, 24, 26 via the communications network 18, 18' for use on the network device 20, 22, 24, 26 in the building 136.

Managing and Sourcing Materials and Services for Energy Retrofit Projects

Energy retrofit projects require the procurement of project materials (equipment, fixtures, and parts) as well as needed services (labor, design, consulting, etc.). Searching for, designing, specifying, pricing, and configuring such materials and services while developing energy retrofit projects requires extensive manual research and time on behalf of the engineer or contractor to solicit bids and quotes from manufacturers, their agents or distributors. This process is made more difficult when bids, quotes and other information from vendors requires manual and time-consuming and error-prone data re-entry into their retrofit project development system. This manual process often results in project delay, error, and cost overruns. The various embodiments of the present invention provide an automated solution to these problems associated with energy audits and energy retrofit projects 159.

An "energy retrofit project" 159 data flow 160 includes plural acts comprising, but not limited to: (1) determining what energy components (i.e., energy consuming components 140, energy producing components 143, etc.) and/or energy accessories (i.e., spare parts, add on components, etc.) exist for an energy system residing in and/or on, a structure with an energy audit (e.g., FIGS. 1-9); (2) determining what new, more efficient energy components and/or energy accessories should be added to the energy system for the structure and the costs thereof; (3) creating one or more work orders with associated costs to complete the a retrofit of the energy components and/or energy accessories (4) accepting proposals for removing some and/or all existing energy components and/or energy accessories for the energy system in and/or on the structure and installing new, more efficient energy components and/or energy accessories to the structure to replace the energy components and/or energy accessories did not exist and/or were not available when the energy system was installed in the structure to replace the existing energy components and/or energy accessories for the energy system that were removed from the structure.

An "energy retrofit project" 159 further includes, but is not limited to, an energy audit (FIG. 1-9), a project proposal to complete the energy retrofit audit, a purchase order for energy components determined in an energy retrofit audit, to a work order to install the energy components, construction documents for the project, progress tracking for the installation work and an invoice for the installation work. The energy project components are provided and tracked in real-time on graphical dashboards and integrated in plural different tools and/or into plural different web-sites.

Figure 10:
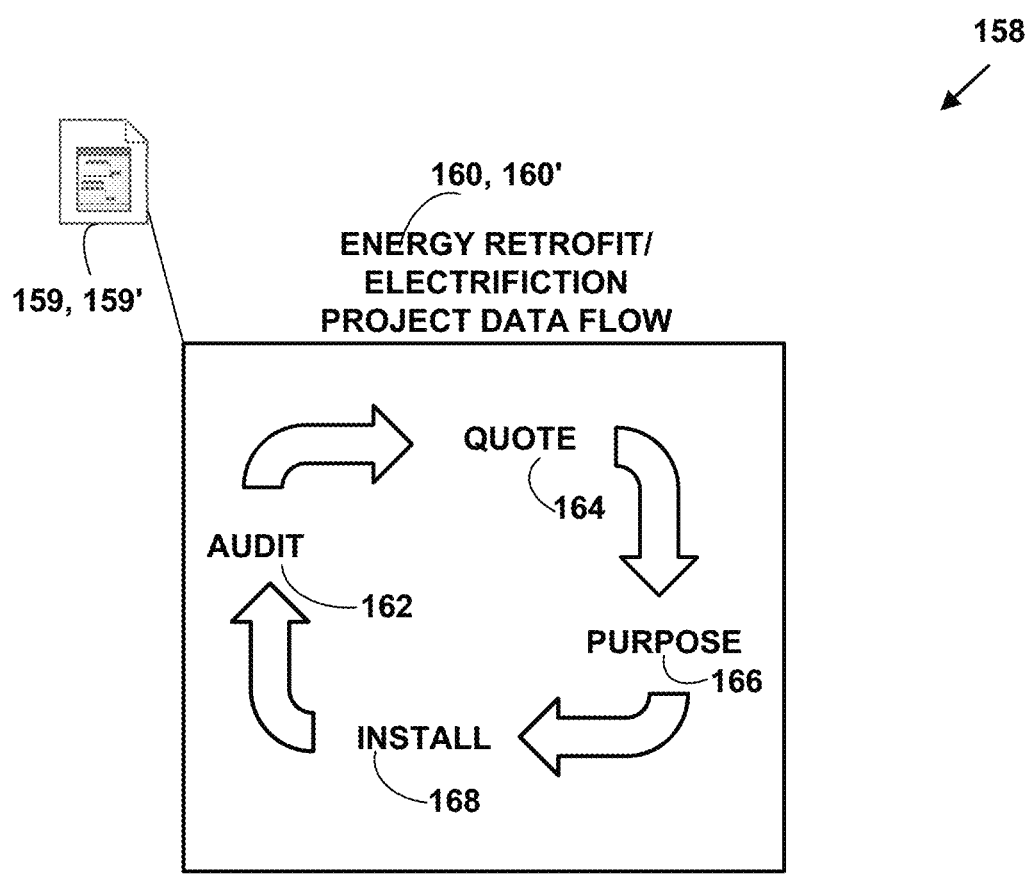
FIG. 10 is a block diagram illustrating an exemplary energy retrofit project and electrification project data flow.

FIG. 10 is a block diagram 158 illustrating an exemplary energy retrofit project and electrification project 160' data flow.

The energy retrofit project 159 data flow 160 and electrification project 160' includes conducting an energy retrofit project/electrification project audit 162, a creating an energy retrofit project/electrification project audit price quote 164, accepting an energy retrofit project/electrification project audit 166 and installing energy retrofit project audit/electrification project components 168.

FIGS. 11A, 11B, 11C and 11D are a flow diagram illustrating a Method 170 for managing and sourcing materials and services for energy retrofit projects.

In FIG. 11A at Step 172, an energy retrofit project management application on a server network device with one or more processors periodically and dynamically collects via a communications network, plural electronic materials and services information from plural different electronic information repositories on a first set of plural server network devices, each with one or more processors. The energy retrofit project management application providing energy retrofit project development workflow and allowing energy retrofit projects to be designed, specified, priced, quoted, tracked and materials and services delivered quicker, with increased accuracy and lower overall project costs. The plural different electronic information repositories including electronic information from plural different manufacturers, suppliers and service providers who provide materials and services for energy retrofit projects. At Step 174, the energy retrofit project management application stores the collected plural electronic energy retrofit project information in a database, using a created plural electronic energy audit information attributes and taxonomies and plural electronic links. The created plural electronic energy retrofit project information and attributes and the plural electronic links in the database providing designing, specifying, searching, pricing, quoting, ordering, and tracking of energy retrofit project materials and services directly from other applications on other network devices. In FIG. 11B at Step 176, the energy retrofit project management application automatically and dynamically creates plural energy retrofit project solutions for a first set of energy retrofit project materials and services required for a first set of energy retrofit projects by automatically linking a first set of electronic information stored in the database to a first set of plural energy retrofit project materials and services from a first set of plural manufacturers, suppliers and service providers with the created plural electronic energy retrofit project information attributes and taxonomies and the plural electronic links. At Step 178, the energy retrofit project management application periodically and dynamically receives a set of plural external energy retrofit project solutions for a second set of energy retrofit project materials and services required for a second set of a plural energy retrofit projects from a second set of plural server network devices each with one or more processors, via the communications network. The set of plural external energy retrofit solutions created for a second set of a plural manufacturers, suppliers and service providers by the plural manufacturers, suppliers and service providers. At Step 180, the energy retrofit project management application stores the received set of plural external energy retrofit project management solutions in the database using the created plural electronic energy retrofit project information attributes and taxonomies and the plural electronic links. In FIG. 11C at Step 182, an electronic energy retrofit project portal is provided with the energy retrofit project management application and database on the server network device to a third set of plural network devices each with one or more processors, via the communications network for managing and providing materials and services for energy retrofit projects. At Step 184, a design component interface is provided on the energy audit portal allowing the third set of network devices to interface a plural energy retrofit projects designs for plural desired energy retrofit projects. The plural energy retrofit project designs are created with external energy audit applications and/or external energy retrofit project design applications. At Step 186, a request for design component is provided on the energy retrofit project portal to directly engage manufacturers, suppliers and design engineers who have expertise in designing energy efficient systems to assist in a design process for a desired energy retrofit project. At Step 188, a request for quote component is provided on the energy retrofit project portal to request price quotes for a required set of energy retrofit project materials and services for the desired energy retrofit project. At Step 190, a request for order component is provided on the energy retrofit project portal to order the required set of energy retrofit project materials for the desired energy retrofit project. In FIG. 11D at Step 192, a request for services component is provided on the electronic portal to request the required set of energy retrofit project services for the desired energy retrofit project. At Step 194, a Universal Fixture Configurator (UFC) is provided on the electronic energy retrofit project portal providing functionality for dynamically creating Stock Keeping Units (SKU) for energy retrofit components required by the desired energy retrofit project and searching for energy retrofit components that match the dynamically created SKUs. The electronic energy retrofit project portal providing designing, specifying, searching, pricing, quoting, ordering and tracking of energy retrofit project materials and services from the electronic energy retrofit project portal on the energy retrofit project management application on the server network device via the communications network for management and providing materials and services for energy retrofit projects for a for the third set of plural network devices via the communications network.

In FIG. 11, Method 170 is illustrated with an illustrative embodiment. However the present invention is not limited to this illustrative embodiment and other embodiments can be used to practice the invention.

In such an illustrative embodiment, in FIG. 11A at Step 172, an energy retrofit project management application 30e' on a server network device 20 with one or more processors periodically, dynamically and automatically collects via a communications network 18, 18', plural electronic materials and services information 39 from plural different electronic information repositories 22', 24', 26' on a first set of a plural server network devices 22, 24, 26, each with one or more processors. The energy retrofit project management application 30e' providing energy retrofit project 159 development workflow and allowing energy audit projects to be designed, specified, priced, quoted, tracked and materials and services delivered quicker, with increased accuracy and lower overall project costs. The plural different electronic information repositories 22', 24', 26' including electronic materials and services information from plural different manufacturers, suppliers and service providers who provide materials and services for energy retrofit projects 159.

In one embodiment, the energy retrofit project management application 30e' is included within a Computer Aided Design (CAD), Building Information Modeling (BIM) or other three-dimensional (3D) modeling program executing on a server network device 20, 22, 24, 26 and/or a target network device 12, 14, 16, 27, 29, 27, 29, 31, 33, 35, 37, 98-104. However, the present invention is not limited to such an embodiment and/or other standalone and/or other embodiments can be used to practice the invention.

In one embodiment, the energy retrofit project management application 30e' and electronic energy retrofit project portal 196 functionality are provided via an Application Programming Interface (API) usable from other design programs including, but not limited to, Computer Aided Design (CAD), Building Information Modeling (BIM) and/or other three-dimensional (3D) modeling programs.

In one embodiment, the plural electronic materials information, includes, but is not limited to, energy retrofit project equipment, fixtures, and/or parts for energy consuming 140, 142 and energy producing 143 devices. The plural electronic services information, includes, but is not limited to, audit collection, design, engineering and/or consulting services.

In one embodiment, the energy retrofit project management application 30e' periodically, dynamically and automatically collects the plural electronic materials and services information on a pre-determined time period (e.g., daily, weekly, monthly, etc.) to keep the plural electronic materials and services information up to date including new materials and services and removing old materials and services that have been discontinued and/or have become obsolete.

In one embodiment, Step 172 further includes applying automatically one or more Artificial Intelligence (AI) methods from the energy retrofit project management application 30e' and/or AI application 30c' and/or a combination thereof to collect the plural electronic materials and services information from the plural different electronic information repositories on the first set of a plural server network devices 22, 24, 26 via the communications network 18, 18'. However, the present invention is not limited to such an embodiment and other embodiments without AI methods can be used to practice the invention.

In one embodiment, the AI methods include predictive analysis methods, prescriptive analysis methods, anomaly detection and/or clustering analysis described herein. In one embodiment, the AI methods are used with and/or without Big Data. However, the present invention is not limited to this embodiment and other embodiments can be used to practice the invention.

In another embodiment, the AI methods include a combination thereof prescriptive analysis, predictive analysis, anomaly detection, clustering analysis. In one embodiment, the combination of AI methods are used with and/or without Big Data. However, the present invention is not limited to such embodiments and other AI methods can be used to practice the invention.

In one exemplary embodiment, the cloud application 30, 30e, 30e' offers cloud services for managing and providing materials and services for energy retrofit projects 159 via a cloud communications network 18. The application 30, 30e, 30e' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64, 64' for managing and providing materials and services for energy retrofit project 159 services. The IaaS, PaaS and SaaS include one or more of cloud services 62 comprising networking, storage, server network device, virtualization, operating system, middleware, run-time, data and/or application services, or plural combinations thereof, on the cloud communications network 18 and the cloud functionality illustrated in Tables 1-3. However, the present invention is not limited to such an embodiment and the invention can be practiced with and/or without cloud services.

At Step 174, the energy retrofit project management application 30e' on the server network device 20 stores the collected plural electronic energy retrofit project information 39 in a database 20', using a created plural electronic energy audit information attributes and taxonomies and plural electronic links. The created plural electronic energy retrofit project information and attributes and the plural electronic links in the database 20' providing designing, specifying, searching, pricing, quoting, ordering, and tracking of energy retrofit project materials and services directly from the energy retrofit project management application 30e' server network device 20 via the communications network 18, 18'.

In one embodiment, the energy retrofit project management application 30e' on the server network device 20 is electronically linked directly to the energy audit management application 30, 30a, 30b, 30c, 30d, 64 providing designing, specifying, searching, pricing, quoting, ordering, and tracking of energy retrofit project 159 materials and services directly from the energy retrofit project management application 30e' server network device 20 via the communication network 18, 18' for energy consuming components 140, 142, energy producing components 143 collected by the energy audit management application 30, 30a, 30b, 30c, 30d, 64. However the present invention is not limited to such embodiments and other embodiments can be used to practice the invention.

In one embodiment, the taxonomies include, but are not limited to, taxonomy terms and taxonomy structures. However the present invention is not limited to such embodiments and other embodiments can be used to practice the invention.

"Taxonomy terms" and related taxonomy structures include, but are not limited to, terms and structures related to a practice and science of classification of things or concepts, including the principles that underlie such classification. In one embodiment, taxonomies of energy retrofit project 159 entities are tree structures whose nodes are labelled with entities likely to occur in an energy retrofit project 159 search query. Search use of these tree structures match keywords from a search query to keywords from answers in the database 20'. Taxonomy terms are main components for many applications of information retrieval, natural language processing and knowledge management. However, the present invention is not limited to such an embodiment and other embodiments may be used to practice the invention.

A "taxonomy structure" with taxonomy terms is a useful way to categorize and organize how content site is searched and connected. Taxonomy terms are organized into groups called "vocabularies." For example, a taxonomy vocabulary called "lighting" may include the taxonomy terms "interior, exterior, incandescent, fluorescent, light emitting diode (LED), wattage, voltage, lumens, etc." However, the present invention is not limited to such an embodiment and other embodiments may be used to practice the invention.

In one embodiment, the database 20' is used to enter, upload and/or maintain large data sets of electronic product information for energy audit materials providers including key reference numbers (e.g., stock keeping unit (SKU) 161, universal product code (UPC), etc.) and plural product specification attributes (e.g., price, status, wattage, lumens, dimensions, optics, etc.).

The database 20' is also used to enter, upload and/or maintain large data sets of electronic service provider information. The database includes plural service profiles based on service provider company capabilities. Service profiles include, but are not limited to, service types, service territories (e.g., geographical areas, etc.) service provider certifications. The service provider enables service provider to be searched and/or requested for potential project opportunities.

In one embodiment, the energy retrofit project management application 30e' enters, uploads and/or maintains large data sets of electronic service provider information. In another embodiment, the service providers themselves enter, upload and/or maintain the electronic service provider information. However, the present invention is not limited to such embodiments and other embodiments can be used to practice the invention.

In one embodiment, at Step 174, one or more Artificial Intelligence (AI) methods described herein are automatically applied from the energy audit management application 30e' to create the plural electronic energy audit information attributes and taxonomies and the plural electronic links. The one or more AI methods can be used with and/or without Big Data. However, the present invention is not limited to such an embodiment and the invention can be practiced with and/or with AI and/or Big Data.

For example, the AI methods are used to collect search terms used within the energy retrofit project management application 30e' and/or from external sources, such as search engines, trade publications, professional organizations, manufactures, suppliers, service providers, etc. However, the present invention is not limited to such an embodiment and other embodiments can be used to practice the invention.

In one embodiment, Step 174 includes storing the created plural electronic energy retrofit information attributes and taxonomies and plural electronic links in one or more cloud storage objects 82 in one or more cloud databases 20'/82. However, the present invention is not limited to such an embodiment and other embodiments and other non-cloud embodiments can be used to practice the invention.

In FIG. 11B at Step 176, the energy retrofit project management application 30e' automatically and dynamically creates plural energy audit solutions 41 for a first set of energy retrofit project 159 materials and services required for a first set of energy retrofit projects 159 by automatically linking a first set of electronic information stored in the database 20' to a first set of plural energy retrofit project 159 materials and services from a first set of plural manufacturers, suppliers and service providers using the created plural electronic energy retrofit information attributes and taxonomies and the plural electronic links.

In one embodiment, the plural audit solutions 41, include, but are not limited to, the energy audit functionality illustrated in Table 5. However, the present invention is not limited to this embodiment, and more, fewer and/or other types of energy retrofit project functionality the plural audit solutions 41 can be used to practice the invention.

TABLE 5

Virtually link and join product parts together to create product solutions that serve a unique application purpose within a building project.
Map or link solutions to a number of typical or a-typical existing building measures (e.g. fixtures, motors, etc.) so that best-fit solutions can be found and specified easily by a user (e.g., contractor, engineer, etc.) via the energy retrofit management application 30e'.
Provide visibility of near live survey and/or audit data over recent time periods, so manufacturers can assess product demand trends and directly map their solutions to these existing measures so that a body of field engineers and contractors can quickly select their energy retrofit solutions for energy retrofit project 159 development, pricing and ultimately ordering.
Define and map channel partners (e.g., agents, distributors, etc.) authorized to sell (e.g., price and/r fulfill orders) the manufacturers' products, including geographic states and regions where such partners represent the manufacturers product line.
Map a manufacturer or channel partner directly to a contractor for pricing and fulfillment.
Define preferred pricing contractor shortlists to offer special pricing based on contractor volume.
Apply contractor-specific pricing lists to individual contractors using the energy audit application 30a (e.g., FIGS. 1-9) to create an energy retrofit project 159.

In one embodiment, Step 176 includes storing the created set of plural energy retrofit projection solutions 41 in one or more cloud storage objects 41/82 in one or more cloud databases 20'/82. However, the present invention is not limited to such an embodiment and other embodiments and other non-cloud embodiments can be used to practice the invention.

At Step 178, the energy retrofit project management application 30e' periodically and dynamically receives a set of plural external energy retrofit project solutions 41' for a second set of energy retrofit project materials and services required for a second set of a plural energy retrofit projects 159 from a second set of plural server network devices 22, 24, 26 each with one or more processors, via the communications network 18, 18', the set of plural external energy retrofit project solutions 41' created for a second set of a plural manufacturers, suppliers and service providers by the plural manufacturers, suppliers and service providers.

In one embodiment, at Step 180, the second set of a plural manufacturers, suppliers and service providers create the set of plural external energy retrofit project solutions 41', include, but are not limited to, the energy retrofit project functionality illustrated in Table 5, specifically for their own products and services. In another embodiment, the set of plural external energy retrofit project solutions 41' include the products and services of other manufacturers, suppliers and service providers. In another embodiment, the set of plural external energy retrofit project solutions 41' include the products and services of other manufacturers, suppliers and service providers who agree to cooperate to provide such external energy retrofit project solutions 41' to be used by others. However, the present invention is not limited to these embodiments and other embodiments may be used to practice the invention.

At Step 180, the energy retrofit project management application 30e' stores the received set of plural external energy retrofit project solutions 41' in the database 20' using the created plural electronic energy retrofit project information attributes and taxonomies and the plural electronic links. This allows the received set of plural external energy retrofit project solutions 41' to be used directly in the energy retrofit project management application 30e' and the energy audit application 30a, for providing designing, specifying, searching, pricing, quoting, ordering, and tracking of energy retrofit project 159 materials and services provided by the second set of plural manufacturers, suppliers and service providers.

In one embodiment, Step 180 includes storing the received set of plural external energy retrofit project solutions 41' in one or more cloud storage objects 41'/82 in one or more cloud databases 20'/82. However, the present invention is not limited to such an embodiment and other embodiments and other non-cloud embodiments can be used to practice the invention.

In FIG. 11C at Step 182, an electronic energy retrofit project portal 196 (FIG. 12) is provided with the energy retrofit project management application 30e' and database 20' on the server network device 20 to a third set of plural network devices, 12, 14, 16, 20, 22, 24, 26, 27, 29, 27, 29, 31, 33, 35, 37, 98-104 each with one or more processors, via the communications network 18, 18' for managing and providing materials and services for energy retrofit projects 159.

The electronic energy retrofit project portal 196 serves as a central hub for suppliers (product materials and services) to input their company's profile information, manage users, add and update product and service data, define channel partners and service territories, and accept and respond to RFD's RFQ's, RFS's and Orders.

The electronic energy retrofit project portal 196 is a digital platform enabling search, specification, pricing, ordering, and tracking of critical energy retrofit project materials and services directly from within an energy audit platform such as energy audit application 30a described above. The electronic the energy retrofit project management application 30e' via the electronic retrofit project portal 196 connects the project development workflow (e.g. request for quote, request for service, request for design, etc.) so that energy retrofit projects can be specified, priced, quoted and delivered with less time, energy, cost and more accuracy.

Figure 12:
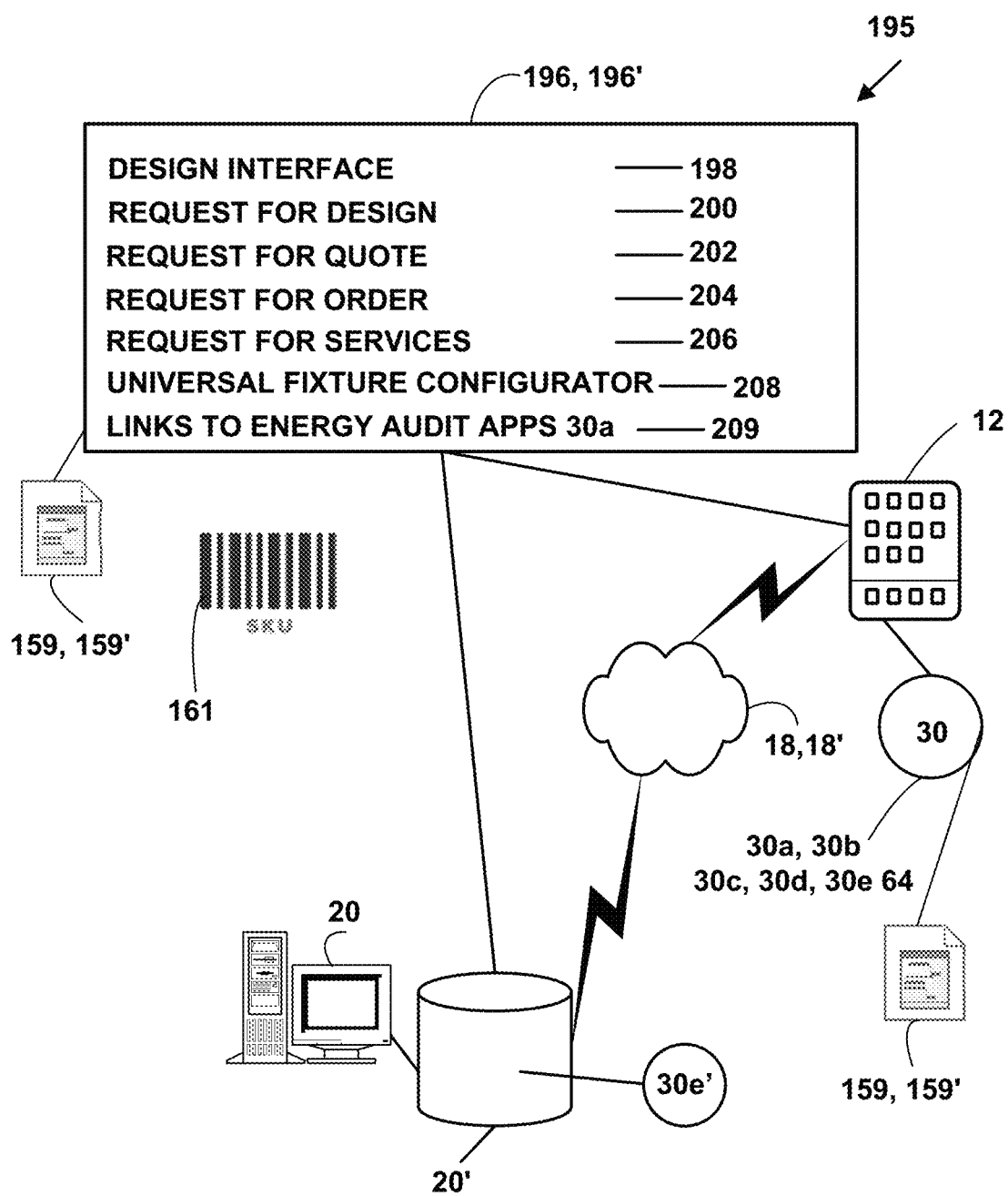
FIG. 12 is a block diagram illustrating an exemplary electronic energy retrofit project portal.

FIG. 12 is a block diagram 195 illustrating an exemplary electronic energy retrofit project portal 196. The exemplary electronic energy retrofit project portal 196, includes, but is not limited to, a design interface component 198, a request for design component 200, a request for quote component 202, a request for order component 204, a request for servicer component 206, a universal fixture configurator (UFC) 208 and/or one or more electronic links 209 to energy audit applications 30a. However, the present invention is not limited to such an embodiment, and more, fewer and/or other components can be used to practice the invention.

Returning to FIG. 11C at Step 184, a design component interface 198 is provided on the electronic energy retrofit project portal 196 allowing the third set of network devices 12, 14, 16, 20, 22, 24, 26, 27, 29, 27, 29, 31, 33, 35, 37, 98-104 to interface (e.g., upload, access remotely, access locally, etc.) to plural energy retrofit project designs for plural desired energy retrofit projects 159. The plural energy retrofit project 159 designs are also created within external energy audit applications such as energy audit application 30a (FIGS. 1-9) etc., in a standalone mode and/or from an existing design program (e.g., CAD, BIM, 3D modeling, etc.).

In one embodiment, the plural energy retrofit project 159 designs include any interaction, collaboration and/or joint interaction for a contractor and/or supplier to work through a best energy retrofit product and labor solution to offer an end customer of a desired energy retrofit project 159. However, the present invention is not limited to such an embodiment and other embodiments can be used to practice the invention.

At Step 186, a request for design component 200 is provided on the electronic energy retrofit project portal 196 to directly engage manufacturers, suppliers and design engineers who have expertise in designing energy efficient systems to assist in a design process for a desired energy retrofit project 159.

In one embodiment, the request for design component 200 allows an Energy Retrofit Company (ERC) to engage manufacturers and distributors who have expertise in both specific product lines and in designing energy efficient system to assist in the design process. This is accomplished by enabling the ERC to select one or many participating manufacturers and distributors and send a completed energy audit (i.e., as-is environment) along with specific "to-be" goals and requirements. The recipients will provide one or many designs using the products they sell and support enabling the ERC to be confident in multiple quotes(s) they provide to their customers. However, the present invention is not limited to such an embodiment and other embodiments can be used to practice the invention.

In one embodiment, the request for design component 200, includes, but is not limited to the functionality provided in Table 6. However, the present invention is not limited to such an embodiment, and more, fewer and/or other types of request for design component 200 functionality can be used to practice the invention.

TABLE 6

Allow a manufacturer, distributor or agent to create and maintain a profile that defines capabilities and geographic coverage of the design services they offer.
Allow for an Energy Retrofit Company (ERC) to filter design companies that provide the design service they require in the geographic area needed.
Provide a mechanism to collect and send all necessary details of a project (Floor Plans, Pictures, Existing devices, to-be Requirements, etc.) to the selected organizations to request design(s).
Allow for a recipient of energy audit project information to review an as-is environment and description of a desired to-be environment.
Allow for a recipient to filter and group like as-is energy consuming devices together for ease of providing a replacement.
Allow for a recipient of an energy retrofit project 159 information search for an already existing energy retrofit project 159 replacement solution or create one if the desired solution does not exist and to apply a replacement to one or many energy consuming devices identified in the as-is data.
Each time an energy retrofit project 159 replacement solution is used, metadata is created to aid the energy retrofit project 159 replacement solution in applying energy retrofit project 159 replacement solutions in the future using a method that uses building type, geography, project requirements.

TABLE 6-continued

Real-time messaging enabling two-way communication between requestor and electronic energy audit portal 196 user for additional information exchange that includes comments and files.
Allow for a recipient to add additional required materials to the design that are outside the direct energy retrofit project 159 replacement solutions.
Allow for a recipient to add applicable pricing to the materials included in the energy retrofit project 156 design.

At Step 188, a request for quote component 202 is provided on the electronic energy retrofit project portal 196 to request price quotes for a required set of energy retrofit project 159 materials and services for the desired energy retrofit project 159.

Upon the completion of an energy facility audit and/or technical survey, a contractor and/or engineer will seek out specific energy retrofit project 159 technical solutions that can be utilized to repair, replace or upgrade key components of building energy systems so they will operate more efficiently. energy retrofit project 159 solutions include one or many parts or components including lighting fixtures, drivers, mounting hardware, wiring assemblies as well as non-lighting components including motors, drives, compressors, etc.

The search for an energy retrofit project 159 solution to an energy audit begins with surveying product offerings from one or many manufacturers based on the specifications required for the energy retrofit. Such a search is conducted on the electronic portal 196 by conducting a digital search by specific product attributes such as wattage, lumens, color temperature, etc.

Upon finding the appropriate product solution, the user can then submit the resulting list of products (including the quantities and part of SKU 161 numbers, etc.) as a Request for Quote (RFQ) to one or many product vendors. These vendors can include distribution companies, manufacturers agents or representatives or directly to the manufacturer themselves.

A supplier will receive notification of the pending RFQ via email, text, etc. including an active URL link that will direct their web browser session to the. Upon authentication into the electronic energy retrofit project portal 196, the supplier' user can review the RFQ, apply pricing to the individual line items and suggest alternative products. Once the RFQ is complete, the supplier's user submits the request, routing it back to the contractor or engineer requester who can choose to accept or reject the RFQ from within their own external energy audit applications such as Energy Audit application 30a, etc. and/or other external applications.

In one embodiment, the request for the request for quote component 202, includes, but is not limited to the functionality provided in Table 7. However, the present invention is not limited to such an embodiment, and more, fewer and/or other types of request for quote component 190 functionality can be used to practice the invention.

TABLE 7

Allows contractor/engineer to search for products/solutions from within external energy audit applications including Energy Audit application 30a' directly from request for quote component 202.
Search criteria can be based on one or many product criteria and attributes including: manufacturer, product type, wattage, certifications, etc.
An electronic energy retrofit project portal 196 user can view supplier-provided product information and photographs including specification sheets, thumbnails, videos, etc.

TABLE 7-continued

An electronic energy retrofit project portal 196 user adds product line items to their quote and then submits the Request for Quote (RFQ) to one or many vendors (e.g., distributors, agents, or manufacturers) for pricing.
An electronic energy retrofit project portal 196 supplier user (e.g., manufacturer, distributor or agent) receives email notification that RFQ from contractor is waiting.
An electronic energy retrofit project portal 196 supplier user (e.g., manufacturer, distributor or agent) logs into the electronic energy retrofit project portal 196 (e.g., manufacturer, distributor or agent) to review RFQ, either decline RFQ or apply pricing, suggest alternative item and submit completed RFQ back to requestor.
The electronic energy retrofit project portal 196 and the request for quote component 202 uses real-time messaging that enables two-way communication between a requestor and an electronic energy retrofit project portal 196 user for additional information exchange that includes comments and files.
Upon submission of completed RFQ from the electronic energy retrofit project portal 196 user, a contractor field user applies desired answered RFQ into their quote (digitally) to prepare their proposal for the customer.
Electronic energy retrofit project portal 196 supplier user (manufacturer, distributor or agent) can attach legal order terms and conditions (either default or specific) to each RFQ.

At Step 190, a request for order component 204 is provided on the electronic energy retrofit project portal 196 to order the required set of energy audit project materials for the desired energy retrofit project 159.

Upon winning an energy retrofit project job, a contractor and/or engineer will mobilize the energy retrofit project which includes ordering the needed materials. The contractor and/or engineer will initiate a purchase order within their own external energy audit applications such as Energy Audit application 30a, etc. via the request for order component 204 on the electronic energy retrofit project portal 196 via the electronic retrofit project management application 30e'. Such a request will be electronically submitted through the communications network 18, 18' to a server network device 22, 24, 26 for the material vendor (manufacturer, distributor and/or agent, etc.) who will receive email, text, etc. notification and access to the order for acknowledgement and processing.

In one embodiment, the request for the request for order component 204, includes, but is not limited to the functionality provided in Table 8. However, the present invention is not limited to such an embodiment, and more, fewer and/or other types of request for order component 204 functionality can be used to practice the invention.

TABLE 8

The electronic energy retrofit project portal 196 user can view all open and closed orders.
The electronic energy retrofit project portal 196 allows views of contractors' order line item details with option to enter unit pricing data.
The electronic energy retrofit project portal 196 and the request for order component 204 uses real-time messaging enabling two-way communication between requestor and electronic energy retrofit project portal 196 user for additional information exchange that includes comments and files.
The request for order component 204 includes shipping details including carrier and tracking information.
The request for order component 204 exports order details for record or exchange with internal accounting department.
The request for order component 204 suggest line-item replacement for products that are discontinued, unavailable or more appropriate.
The request for order component 204 includes mass or line-item acceptance of line item order details.

In FIG. 11D at Step 192, a request for services component 206 is provided on the electronic energy retrofit project portal 196 to request the required set of retrofit project services for the desired energy retrofit project 159.

Engineers and contactors of ERC often seek to fulfill project development or project implementations tasks by contracting with one or many sub-contract firms. The tasks can range from conducting site surveys and audits, to providing design services to managing an entire energy retrofit installation project or even verifying the successful installation of a project.

One of the critical problems in the electrical construction field is finding enough qualified and experienced workers to perform these tasks. Searching can be extremely time and labor intensive and provides no guarantee that an ERC will locate the needed talent often forcing them to forgo accepting the electronic retrofit project 159.

The request for services component 206 allows engineers and contractors of ERCs to submit a Request for Service (RFS) including specifications of one or more services (e.g., instillation, etc.) they require and have those requirements communicated to service providers who meet those criteria in order for them to respond or bid on those service requests.

In one embodiment, request for services component 206, includes, but is not limited to the functionality provided in Table 9. However, the present invention is not limited to such an embodiment, and more, fewer and/or other types of request for services component 206 functionality can be used to practice the invention.

TABLE 9

ERCs and/or external retrofit project management application 30e' as requester initiates an RFS including one or more services need, location of the work, experience or certifications required and project timeframe, etc.
A service provider receives message from the request for services component 206 via the electronic retrofit project portal 196 that an RFS that meets their capabilities has been received.
The service provider responds to requester the request for services component 206 via the electronic retrofit project portal 196 with their response indicating their interest in receiving further detail about the request. The service provider can also decline the request.
The requester communicates additional project requirement information (including project scope details) to the service provider through the request for services component 206 on the electronic retrofit project portal 196.
The request for services component 206 on the electronic retrofit project portal 196 uses real-time messaging enabling two-way communication between requestor and electronic energy retrofit project 196 user for additional information exchange that includes comments and files.
A service Provider submits their proposal/bid including cost estimate to the requester via the request for services component 206 on the retrofit project portal 196.
A requester accepts or rejects the service provider's response.

In FIG. 11D at Step 194, a Universal Fixture Configurator (UFC) 208 is provided on the electronic energy retrofit project portal 196 providing functionality for dynamically creating Stock Keeping Units (SKU) 161 for energy retrofit components required by the desired energy retrofit project 159 and searching for energy retrofit components that match the dynamically created SKUs 161.

The electronic energy retrofit project portal 196 providing designing, specifying, searching, pricing, quoting, ordering and tracking of energy retrofit project materials and services from the electronic energy retrofit project portal 196 on the energy retrofit project management application 30e' on the server network device 20 via the communications network for management and providing materials and services for energy retrofit projects 159 for a third set of plural network devices 12, 14, 16, 20, 22, 24, 26, 27, 29, 27, 29, 31, 33, 35, 37, 98-104 via the communications network 18, 18'.

The UFC 208 allows manufacturers to enter and maintain combination "rules" for each product offering. These rules define how a Stock Keeping Unit (SKU) 161 for that product is constructed, valid options and a resulting specification (e.g., watts, lumens, color, temperature, etc.). The UFC allows users to both create SKUs 161 and simultaneously search the catalog for existing SKUs 161 that match.

Retrofit contractors require accurate and detailed product data to "specify" the appropriate solution to replace or upgrade current energy-consuming equipment. The current approach to aggregating this information is to enable manufacturers to upload a short list of the most common SKUs 161 to the electronic audit application 30a and/or the electronic retrofit project management application 30e' on the server network device 20 to allow users to choose from a database 20' to create a SKU 161 solution.

A SKU 161 for any given energy retrofit fixture or other product along with the numerous available options and permutations can result in tens of thousands individual part numbers for each product line. Each product has a published Specification Sheet (i.e., Cut Sheet, etc.) created by a manufacturer defining how the SKU 161 is constructed and all possible configuration options.

Since a single product line for a given manufacturer may have thousand or tens of thousands of possible combinations, loading all possible SKU 161 combinations into the database 20' for all manufacturers, and all product lines as well as maintain them among a rapidly changing product specifications would be untenable. Therefore, the UFC component 208 is used to dynamically create SKUs 161 instead.

In one embodiment, the UFC component 208, includes, but is not limited to the functionality provided in Table 10. However, the present invention is not limited to such an embodiment, and more, fewer and/or other types of UFC component 208 functionality can be used to practice the invention.

TABLE 10

The electronic retrofit project portal 196 includes the UFC 208 to allow manufacturers to define a set of rules for product lines they offer including, but not limited to:
Base SKU 161;
Available options;
Required parts of the SKU 161;
Restrictions on options that can be chosen together;
How the configuration will affect the final base product (e.g., watts, lumens, color temp, CRI, volts, etc.);
Required parts of the SKU 161; and
Optional Accessories that can be ordered as part of the product line.
A user of the electronic retrofit project portal 196 and UFC 208 "builds" a SKU 161 from the rules defined in the system by clicking through a series of visual configuration queues. The completion of this action yields the appropriate specification required for the solution. The sequence of this series may include the following steps:
Choose base product;
Choose options;
See SKU 161 being created and resulting specs (e.g. watts, lumens, color temp, cost); and
View results of a simultaneous search into the catalog that returns matching SKUs 161 already in the system.
The UFC 208 and a newly created SKUs 161 and its optional accessories can be used in a solution/RFS response.
Using the same rules defined in the UFC 208, a user can "reverse search" the UFC database 20' to find all corresponding product lines that meet a specific criteria (ex. range of watts, lumens, voltage, color, etc.). This will allow a user to quickly narrow down manufacturers and product lines that meet the needs of an energy retrofit project they are working on.

Figure 13:
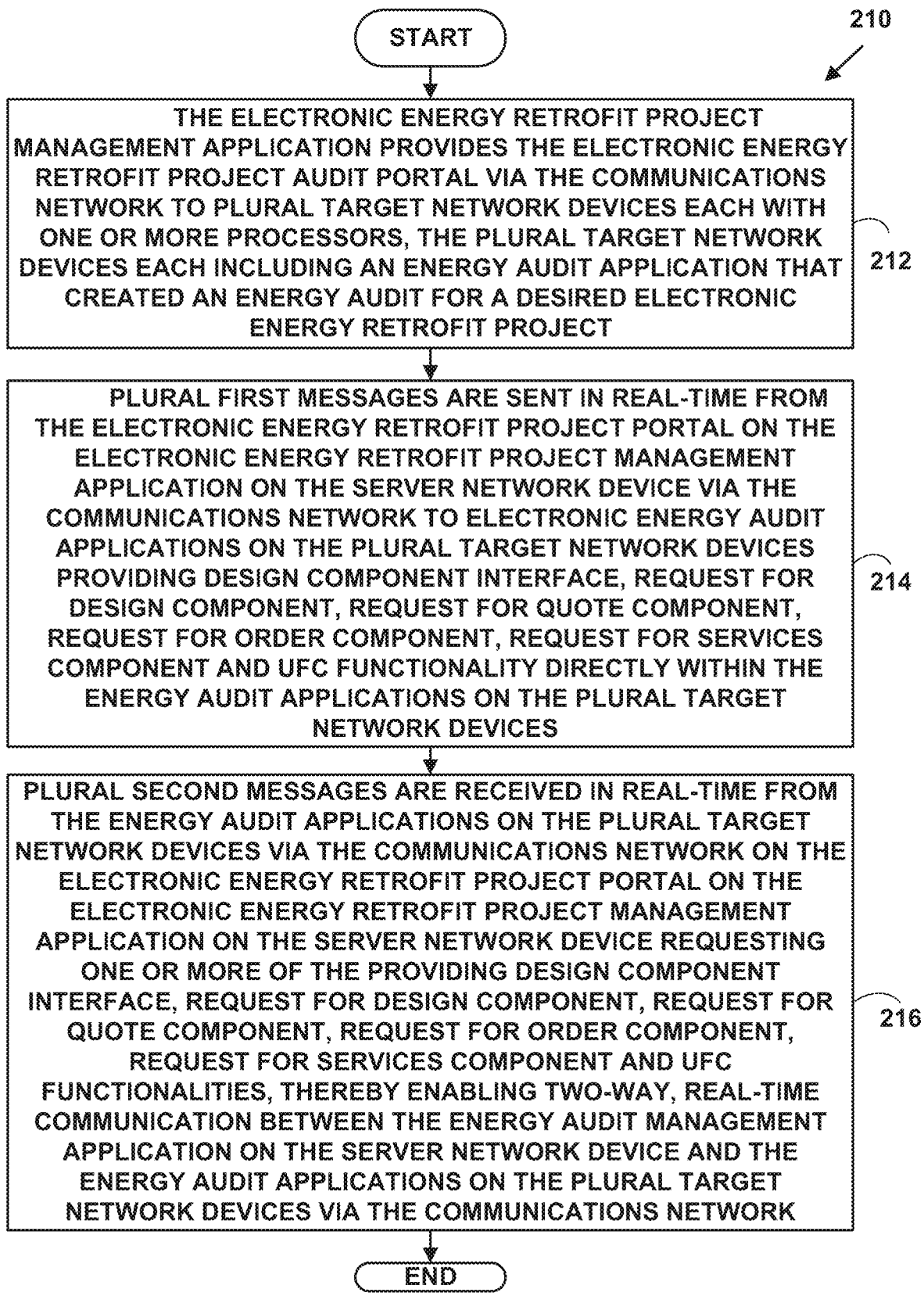
FIG. 13 is a flow diagram illustrating a method for managing and sourcing materials and services for energy retrofit projects.

FIG. 13 is a flow diagram illustrating a Method 210 for managing and sourcing materials and services for energy retrofit projects.

In FIG. 13, at Step 212, an electronic energy retrofit project management application provides an electronic energy retrofit project portal via a communications network to plural target network devices each with one or more processors, the plural target network devices each including an energy audit application that created an energy audit for a desired electronic energy retrofit project. At Step 214, plural first messages are sent in real-time from the electronic energy retrofit project portal on the electronic energy retrofit project management application on the server network device via the communications network to electronic energy audit applications on the plural target network devices providing a design component interface, request for design component, request for quote component, request for order component and request for services component functionality directly within the energy audit applications on the plural target network devices. At Step 216, plural second messages are received in real-time from the energy audit applications on the plural target network devices via the communications network on the electronic energy retrofit project portal on the electronic energy retrofit project management application on the server network device requesting one or more of the providing design component interface, request for design component, request for quote component, request for order component and request for services component functionalities, thereby enabling two-way, real-time communication between the energy retrofit project management application on the server network device and the energy audit applications on the plural target network devices via the communications network.

In FIG. 13, Method 212 is illustrated with an illustrative embodiment. However the present invention is not limited to this illustrative embodiment and other embodiments can be used to practice the invention.

In such an exemplary embodiment, in FIG. 13 at Step 212, the electronic energy retrofit project portal management application 30e' provides the electronic energy retrofit project portal 196 via the communications network 18, 18' to plural target network devices each with one or more processors, the plural target network devices 12, 14, 16, 20, 22, 24, 26, 27, 29, 27, 29, 31, 33, 35, 37, 98-104 each including an energy audit application 30a that created an energy audit 13, 15, 13'/82, 15'/82 for the desired energy audit project 159. The energy audit application 30a and the created energy audit 13, 15, 13'/82, 15'/82 for the desired energy audit project 159 are automatically and seamlessly linked 209 to electronic energy retrofit project audit portal 196 for use within the electronic energy retrofit project audit portal 196.

At Step 214, plural first messages are sent in real-time from the electronic energy retrofit project audit portal 196 on the electronic energy retrofit project audit portal management application 30e' on the server network device 20 via the communications network 18,18' to energy audit applications 30a on the plural target network devices 12, 14, 16, 20, 22, 24, 26, 27, 29, 27, 29, 31, 33, 35, 37, 98-104 providing design component interface 198, request for design component 200, request for quote component 202, request for order component 204 and request for services component 206 functionality directly within the energy audit applications 30a on the plural target network devices 12, 14, 16, 20, 22, 24, 26, 27, 29, 27, 29, 31, 33, 35, 37, 98-104.

At Step 216, plural second messages are received in real-time from the energy audit applications 30a on the plural target network devices 12, 14, 16, 20, 22, 24, 26, 27, 29, 27, 29, 31, 33, 35, 37, 98-104, via the communications network 18, 18' via the electronic energy retrofit project audit portal 196 on the electronic energy retrofit project audit management application 30e' on the server network device 20 requesting one or more of the providing design component interface 198, request for design component 200, request for quote component 202, request for order component 204 and request for services component 206 functionalities, thereby enabling two-way, real-time communication between the electronic energy retrofit project management application 30e' on the server network device 20 and the energy audit applications 30a on the plural target network devices 12, 14, 16, 20, 22, 24, 26, 27, 29, 27, 29, 31, 33, 35, 37, 98-104 via the communications network 18, 18'.

Figure 14:
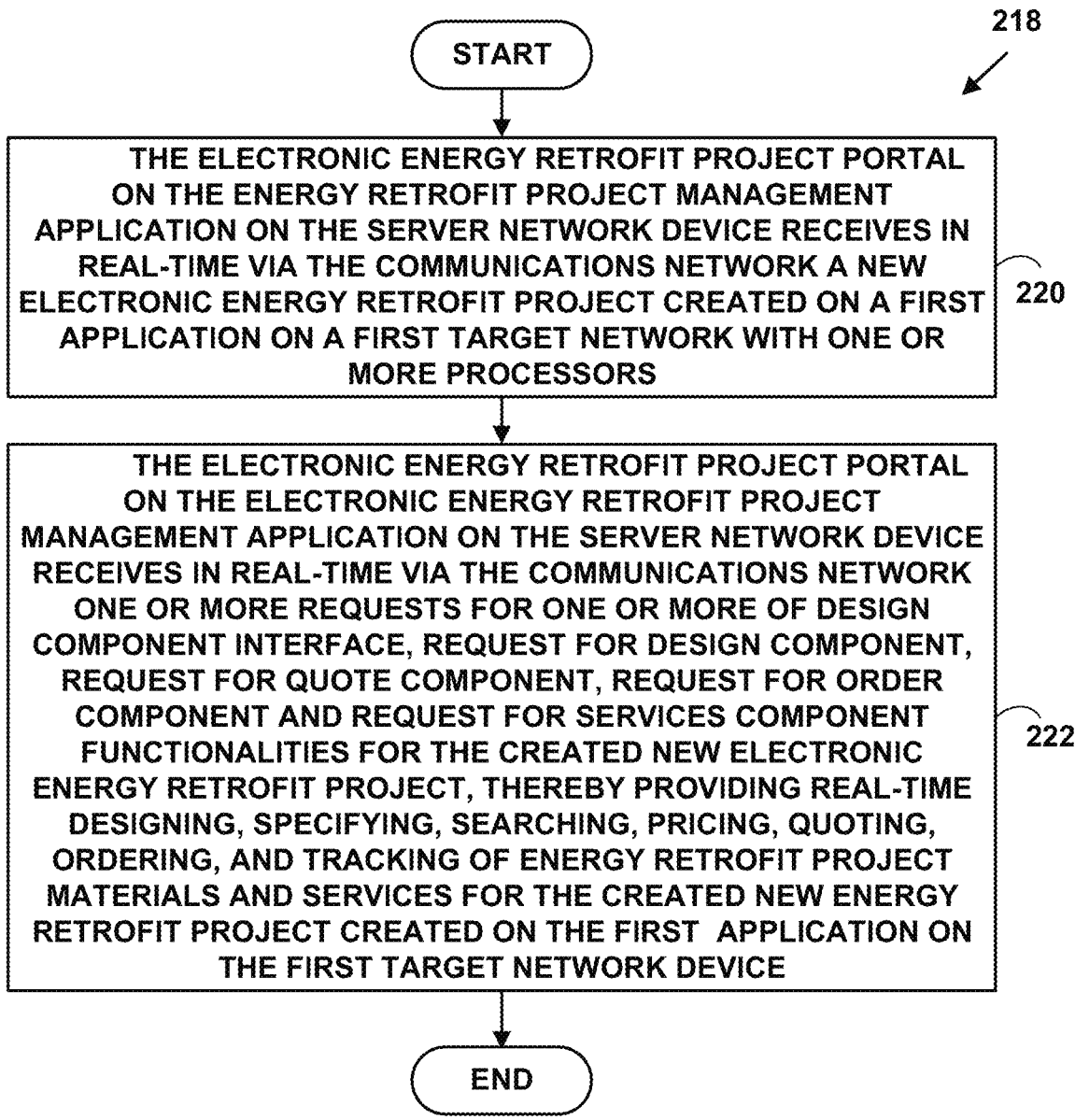
FIG. 14 is a flow diagram illustrating a method for managing and sourcing materials and services for energy retrofit projects.

FIG. 14 is a flow diagram illustrating a illustrating a Method 218 for managing and sourcing materials and services for energy retrofit projects.

In FIG. 14, at Step 220, the electronic energy retrofit project portal on the energy retrofit project management application on the server network device receives in real-time via the communications network the, a new electronic energy retrofit project created on a first application on a first target network device with one or more processors. At Step 222, the electronic energy retrofit project portal on the electronic energy retrofit project management application on the server network device receives in real-time via the communications network one or more requests for one or more of design component interface, request for design component, request for quote component, request for order component and request for services component functionalities for the created new electronic energy retrofit project, thereby providing real-time designing, specifying, searching, pricing, quoting, ordering, and tracking of energy retrofit project materials and services for the created new energy retrofit project created on the first energy retrofit project application on the first target network device via the communications network.

In FIG. 14, Method 220 is illustrated with an illustrative embodiment. However the present invention is not limited to this illustrative embodiment and other embodiments can be used to practice the invention.

In such an exemplary embodiment, in FIG. 14 at Step 220, the electronic energy retrofit project portal 196 on the energy retrofit project management application 30e' on the server network device 20 receives in real-time via the communications network 18, 18' a new electronic energy retrofit project 159 created on a first application 30 on a first target network device 12, 14, 16, 27, 29, 27, 29, 31, 33, 35, 37, 98-10 with one or more processors.

In one embodiment, the first application, includes, but is not limited to, an energy audit application 30a, an energy audit offline application 30b, an AI application 30c, an energy retrofit project management application 30e and/or other application 30. However, the present invention is not limited to these embodiments and other embodiments can be used to practice the invention.

At Step 22, the retrofit project management application on the server network device receives in real-time via the communications network, one or more requests for one or more of design component interface 198, request for design component 200, request for quote component 202, request for order component 204 and request for services component 206 functionalities for the created new electronic energy retrofit project 159, thereby providing real-time designing, specifying, searching, pricing, quoting, ordering, and tracking of energy retrofit project materials and services for the created new energy retrofit project 159 created on the first application 30 on the first target network device 12, 14, 16, 27, 29, 27, 29, 31, 33, 35, 37, 98-10 via the communications network 18, 18'.

Figure 15:
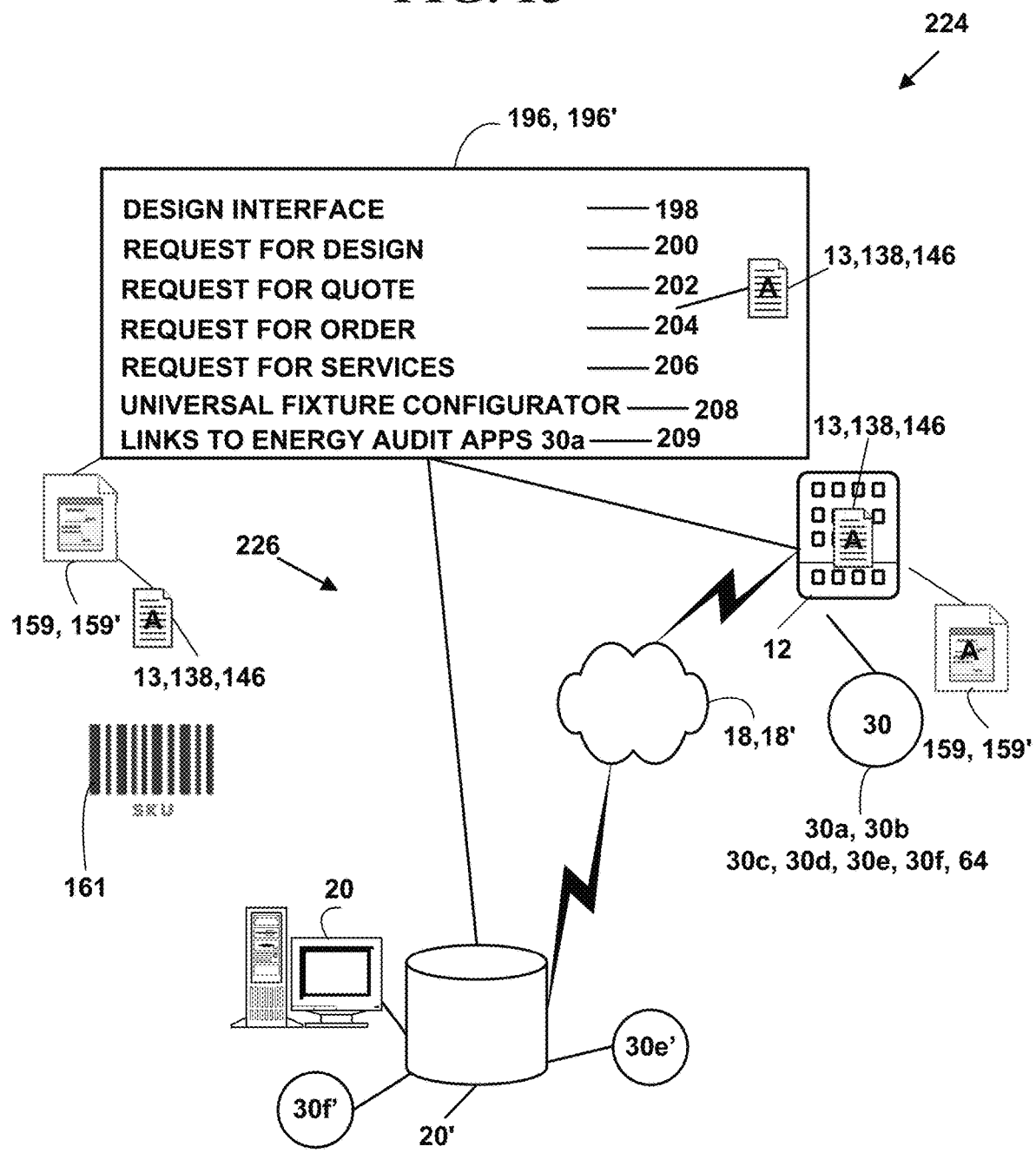
FIG. 15 is a flow diagram illustrating a method for managing and sourcing materials and services for energy retrofit projects for the method of FIG. 14.

FIG. 15 is a block diagram 224 illustrating a data flow 226 for managing and providing materials and services for energy audits for the Method of FIG. 14.

In FIG. 15, a new electronic energy audit 13, 138, 146 is created on a first energy audit application 30a on a first target network device 12 with one or more processors. The first energy audit application 30a on first target network device 12 accesses the electronic energy retrofit project portal 196 on the electronic energy retrofit project management application 30e' on the server network device 20 via the communications network 18, 18' for real-time designing, specifying, searching, pricing, quoting, ordering, and tracking of energy retrofit materials and services required for the new energy retrofit project 159.

A method and system managing and sourcing materials and services for energy retrofit projects is presented herein. An electronic energy retrofit project portal provides real-time designing, specifying, searching, pricing, quoting, ordering, and tracking of energy audit project materials and services required for a desired electronic energy retrofit project. The functionality of the electronic energy retrofit project portal is available in real-time directly and from within existing design programs that create and provide energy audit projects and available as a standalone portal.

Electrification

Electrification includes converting electric consuming devices from fossil-fuel powered devices ones powered by electricity. Such conversions are called "electrification" projects.

For existing buildings, electrification includes replacing gas and oil fired components with highly-efficient electric alternatives, adopting new policies to retrofit existing buildings with electrification components. For new buildings, electrification includes including highly-efficient electric alternative energy consuming components in the original design.

In existing factories and manufacturing facilities, industrial processes that currently rely on fossil fuels for heating and cooling are also being electrified.

Electrification creates benefits like reducing operating costs and improving air quality and public health.

The auto industry is also undergoing electrification. For example, a gasoline pump what dispenses gasoline is converted to an electric vehicle (EV) charging station.

An electric vehicle (EV) is defined as a vehicle that can be powered by an electric motor that draws electricity from a battery and is capable of being charged from an external source. An EV includes both a vehicle that can only be powered by an electric motor that draws electricity from a battery (all-electric vehicle) and a vehicle that can be powered by an electric motor that draws electricity from a battery and by an internal combustion engine (plug-in hybrid electric vehicle).

An EV charging station, also known as a charge point or electric vehicle supply equipment, is a piece of equipment that supplies electrical power for charging plug-in electric vehicles.

An EV infrastructure includes structures, machinery, and equipment necessary and integral to support an electric vehicle, including battery charging stations, rapid charging stations, and battery exchange stations.

FIGS. 16A, 16B, 16C and 16D are a flow diagram illustrating a Method 228 for managing and sourcing materials and services for electrification projects.

In FIG. 16A at Step 230, an electrification project management application on a server network device with one or more processors periodically and dynamically collects via a communications network, plural electronic materials and services information from plural different electronic information repositories on a first set of plural server network devices, each with one or more processors. The electrification project management application providing electrification project development workflow and allowing electrification projects to be designed, specified, priced, quoted, tracked and materials and services delivered quicker, with increased accuracy and lower overall project costs. The plural different electronic information repositories including electronic information from plural different manufacturers, suppliers and service providers who provide materials and services for electrification projects. At Step 232, the electrification project management application stores the collected plural electrification project information in a database, using a created plural electronic energy audit information attributes and taxonomies and plural electronic links. The created plural electrification project information and attributes and the plural electronic links in the database providing designing, specifying, searching, pricing, quoting, ordering, and tracking of electrification project materials and services directly from other applications on other network devices. In FIG. 16B at Step 234, the electrification project management application automatically and dynamically creates plural electrification project solutions for a first set of electrification project materials and services required for a first set of electrification projects. At Step 236, the electrification project management application automatically links a first set of electronic information stored in the database to a first set of plural electrification project materials and services from a first set of plural manufacturers, suppliers and service providers with the created plural electrification project information attributes and taxonomies and the plural electronic links. At Step 238, the electrification project management application periodically and dynamically receives a set of plural external electrification project solutions for a second set of electrification project materials and services required for a second set of a plural electrification projects from a second set of plural server network devices each with one or more processors, via the communications network. The set of plural external electrification solutions created for a second set of a plural manufacturers, suppliers and service providers by the plural manufacturers, suppliers and service providers. At Step 240, the electrification project management application stores the received set of plural external electrification project management solutions in the database using the created plural electrification project information attributes and taxonomies and the plural electronic links. In FIG. 16D at Step 242, an electrification project portal is provided with the electrification project management application and database on the server network device to a third set of plural network devices each with one or more processors, via the communications network for managing and providing materials and services for electrification projects. At Step 244, a design component interface is provided on the energy audit portal allowing the third set of network devices to interface plural electrification projects designs for plural desired electrification projects. The plural electrification project designs are created with external energy audit applications and/or external electrification project design applications. At Step 246, a request for design component is provided on the electrification project portal to directly engage manufacturers, suppliers and design engineers who have expertise in designing energy efficient systems to assist in a design process for a desired electrification project. At Step 248, a request for quote component is provided on the electrification project portal to request price quotes for a required set of electrification project materials and services for the desired electrification project. At Step 250, a request for order component is provided on the electrification project portal to order the required set of electrification project materials for the desired electrification project. In FIG. 16D at Step 252, a request for services component is provided on the electronic portal to request the required set of electrification project services for the desired electrification project. At Step 254, a Universal Fixture Configurator (UFC) is provided on the electrification project portal providing functionality for dynamically creating Stock Keeping Units (SKU) for electrification components required by the desired electrification project and searching for electrification components that match the dynamically created SKUs. The electrification project portal providing designing, specifying, searching, pricing, quoting, ordering and tracking of electrification project materials and services from the electrification project portal on the electrification project management application on the server network device via the communications network for management and providing materials and services for electrification projects for a for the third set of plural network devices via the communications network.

In FIG. 16, Method 256 is illustrated with an illustrative embodiment. However the present invention is not limited to this illustrative embodiment and other embodiments can be used to practice the invention.

In such an illustrative embodiment, in FIG. 16A at Step 230, an electrification project management application 30*f* on a server network device 20 with one or more processors periodically, dynamically and automatically collects via a communications network 18, 18', plural electronic materials and services information 39 from plural different electronic information repositories 22', 24', 26' on a first set of a plural server network devices 22, 24, 26, each with one or more processors. The electrification project management application 30*f* providing electrification project 159' development workflow and allowing energy audit projects to be designed, specified, priced, quoted, tracked and materials and services delivered quicker, with increased accuracy and lower overall project costs. The plural different electronic information repositories 22', 24', 26' including electronic materials and services information from plural different manufacturers, suppliers and service providers who provide materials and services for electrification projects 159'.

In one embodiment, the electrification project management application 30*f* is included within a Computer Aided Design (CAD), Building Information Modeling (BIM) or other three-dimensional (3D) modeling program executing on a server network device 20, 22, 24, 26 and/or a target network device 12, 14, 16, 27, 29, 27, 29, 31, 33, 35, 37, 98-104. However, the present invention is not limited to such an embodiment and/or other standalone and/or other embodiments can be used to practice the invention.

In one embodiment, the electrification project management application 30*f* and electrification project portal 196' functionality are provided via an Application Programming Interface (API) usable from other design programs including, but not limited to, Computer Aided Design (CAD), Building Information Modeling (BIM) and/or other three-dimensional (3D) modeling programs.

In one embodiment, the plural electronic materials information, includes, but is not limited to, electrification project equipment, fixtures, and/or parts for energy consuming 140, 142 and energy producing 143 devices. The plural electronic services information, includes, but is not limited to, collection, design, engineering and/or consulting services.

In one embodiment, the electrification project management application 30*e'* periodically, dynamically and automatically collects the plural electronic materials and services information on a pre-determined time period (e.g., daily, weekly, monthly, etc.) to keep the plural electronic materials and services information up to date including new materials and services and removing old materials and services that have been discontinued and/or have become obsolete.

In one embodiment, Step 230 further includes applying automatically one or more Artificial Intelligence (AI) methods from the electrification project management application 30*f* and/or AI application 30*c'* and/or a combination thereof to collect the plural electronic materials and services information from the plural different electronic information repositories on the first set of a plural server network devices 22, 24, 26 via the communications network 18, 18'. However, the present invention is not limited to such an embodiment and other embodiments without AI methods can be used to practice the invention.

In one embodiment, the AI methods include predictive analysis methods, prescriptive analysis methods, anomaly detection and/or clustering analysis described herein. In one embodiment, the AI methods are used with and/or without Big Data. However, the present invention is not limited to this embodiment and other embodiments can be used to practice the invention.

In another embodiment, the AI methods include a combination thereof prescriptive analysis, predictive analysis, anomaly detection, clustering analysis. In one embodiment, the combination of AI methods are used with and/or without Big Data. However, the present invention is not limited to such embodiments and other AI methods can be used to practice the invention.

In one exemplary embodiment, the cloud application 30, 30*f*, 30*f* offers cloud services for managing and providing materials and services for electrification projects 159' via a cloud communications network 18. The application 30, 30*e*, 30*e'* offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64, 64' for managing and providing materials and services for electrification project 159' services. The IaaS, PaaS and SaaS include one or more of cloud services 62 comprising networking, storage, server network device, virtualization, operating system, middleware, run-time, data and/or application services, or plural combinations thereof, on the cloud communications network 18 and the cloud functionality illustrated in Tables 1-3. However, the present invention is not limited to such an embodiment and the invention can be practiced with and/or without cloud services.

In one embodiment, the electrification projects include replacing energy consuming components 140, 142 powered by fossil fuels with energy consuming components powered by electricity created from stored power devices 145 and other electricity sources (e.g., private electrical grid, public electrical grid, etc.). However, the present invention is not limited to such embodiments and other embodiments can also be used to practice the invention.

In one embodiment, the energy consuming components 140, 142 include, but are not limited to, lighting, heating, ventilation, air conditioning, motors, variable, frequency drives, transformers, generators, steam boilers, water pumps, water heaters, heat pumps, and combinations thereof. However, the present invention is not limited to such embodiments and other embodiments can also be used to practice the invention.

In one embodiment, the stored power devices 145, include, but are not limited to, batteries, capacitors, long-duration energy storage (LDES) devices, thermal energy storage (TES) devices, hydro energy storage (HES) devices, flywheel energy storage devices, compressed air storage devices, cryogenic energy storage (CES) devices, superconducting magnetic energy storage (SMES) devices, pumped storage hydraulic energy storage (PSHES) devices, Electric Vehicle (EV) charging station devices, EV infrastructure devices or combinations thereof. However, the present invention is not limited to such embodiments and other embodiments can also be used to practice the invention.

Long-duration energy storage (LDES) devices include, but are not limited to, electric storage systems that can provide at least 10 hours or more of. stored energy. However, the present invention is not limited to such embodiments and other embodiments can also be used to practice the invention.

Thermal energy storage (TES) devices, include but are not limited to, devices that temporarily store energy by heating or cooling various storage mediums for later reuse. However, the present invention is not limited to such embodiments and other embodiments can also be used to practice the invention.

Hydro energy storage (HES) devices, include but are not limited to, hydroelectric energy storage devices used by electric power systems. The devices store energy in the form of gravitational potential energy of water, pumped from a lower elevation reservoir to a higher elevation. Low-cost surplus off-peak electric power is typically used to run the pumps. During periods of high electrical demand, the stored water is released through turbines to produce electric power. However, the present invention is not limited to such embodiments and other embodiments can also be used to practice the invention Flywheel energy storage devices, include but are not limited to, devices that use electric energy input which is stored in the form of kinetic energy. Kinetic energy can be described as "energy of motion." Flywheel energy storage devices us motion of a spinning mass, called a rotor. The rotor spins in a nearly frictionless enclosure. When power is required, the inertia allows the rotor to spin and the resulting kinetic energy is converted to electricity. However, the present invention is not limited to such embodiments and other embodiments can also be used to practice the invention.

Compressed air storage devices, include but are not limited to, devices that allow air to be compressed and expanded. Compression of air creates heat. The air is warmer after compression. Expansion removes heat. If no extra heat is added, the air will be much colder after expansion. If the heat generated during compression can be stored and used during expansion, the efficiency of the storage improves considerably. Compressed air storage devices include adiabatic, diabatic, isothermal, and/or near-isothermal compressed air storage devices. However, the present invention is not limited to such embodiments and other embodiments can also be used to practice the invention.

Cryogenic energy storage (CES) devices, include but are not limited to, the use of low temperature (cryogenic) liquids such as liquid air or liquid nitrogen to store energy. CES devices are sustainable, low-carbon, energy storage systems. However, the present invention is not limited to such embodiments and other embodiments can also be used to practice the invention.

Superconducting magnetic energy storage (SMES) devices, include but are not limited to, devices that store energy in a magnetic field created by the flow of direct current in a superconducting coil which has been cryogenically cooled to a temperature below its superconducting critical temperature. However, the present invention is not limited to such embodiments and other embodiments can also be used to practice the invention.

Pumped hydraulic energy storage (PHES) devices, include, but are not limited to, devices that produce kinetic energy in the form of flow and potential energy in the form of pressure. PHES devices include, impoundment, diversion, and pumped storage devices. However, the present invention is not limited to such embodiments and other embodiments can also be used to practice the invention.

Electric Vehicle (EV) charging station devices, include, but are not limited to, vehicles that use a battery pack to store electrical energy that powers a motor in the electronic vehicle. The batteries are charged by plugging the vehicle in to an electric power source. However, the present invention is not limited to such embodiments and other embodiments can also be used to practice the invention.

EV infrastructure devices, include, but are nut limited to, structures, machinery, and equipment necessary and integral to support a EV, including battery charging stations, rapid charging stations, and/or battery exchange stations. A battery charging station is defined as an electrical component assembly or cluster of component assemblies designed specifically to charge batteries within an EV. A rapid charging station is defined as an industrial grade electrical outlet that, allows for faster recharging of EV batteries through higher power levels. A battery exchange station is defined as a fully automated facility that will enable an EV with a swappable battery to enter a drive lane and exchange the depleted battery with a fully charged battery through a fully automated process. However, the present invention is not limited to such embodiments and other embodiments can also be used to practice the invention.

At Step 232, the electrification project management application 30*f* on the server network device 20 stores the collected plural electrification project information 39' in a database 20', using a created plural electrification project information attributes and taxonomies and plural electronic links. The created plural electrification project information and attributes and the plural electronic links in the database 20' providing designing, specifying, searching, pricing, quoting, ordering, and tracking of electrification project materials and services directly from the electrification project management application 30*f* server network device 20 via the communications network 18, 18'.

In FIG. 16B at Step 234, the energy retrofit project management application 30*f* automatically and dynamically creates plural electrification project solutions 41' for a first set of electrification project 159' materials and services required for a first set of electrification projects 159'.

At Step 236, the energy retrofit project management application 30*f* automatically links a first set of electronic information stored in the database 20' to a first set of plural electrification project 159' materials and services from a first set of plural manufacturers, suppliers and service providers using the created plural electronic energy retrofit information attributes and taxonomies and the plural electronic links.

At Step 238, the electrification project management application 30f periodically and dynamically receives a set of plural external electrification project solutions for a second set of electrification project materials and services required for a second set of a plural electrification projects from a second set of plural server network devices each with one or more processors, via the communications network. The set of plural external electrification solutions created for a second set of a plural manufacturers, suppliers and service providers by the plural manufacturers, suppliers and service providers.

At Step 240, the electrification project management application 30f stores the received set of plural external electrification project management solutions 41' in the database 20' using the created plural electrification project information attributes and taxonomies and the plural electronic links.

In FIG. 16D at Step 242, an electrification project portal 196' is provided with the electrification project management application 30f and database 20' on the server network device 20 to a third set of plural network devices 12, 14, 16, 20, 22, 24, 26, 27, 29, 31, 33, 37, 98-104 each with one or more processors, via the communications network 18, 18' for managing and providing materials and services for electrification projects 159'.

At Step 244, a design component interface 198' is provided on the energy audit portal 196' allowing the third set of network devices 12, 14, 16, 20, 22, 24, 26, 27, 29, 31, 33, 37, 98-104 to interface plural electrification projects designs for plural desired electrification projects 159'. The plural electrification project designs are created with external electrification applications and/or external electrification project design applications.

At Step 246, a request for design component 200 is provided on the electrification project portal 196' to directly engage manufacturers, suppliers and design engineers who have expertise in designing energy efficient systems to assist in a design process for a desired electrification project 159'.

At Step 248, a request for quote component 202 is provided on the electrification project portal 196' to request price quotes for a required set of electrification project materials and services for the desired electrification project.

At Step 250, a request for order component 204 is provided on the electrification project portal 196' to order the required set of electrification project materials for the desired electrification project 159'.

In FIG. 16D at Step 252, a request for services 206 component 206 is provided on the electronic portal 196' to request the required set of electrification project services for the desired electrification project 159'.

At Step 254, a Universal Fixture Configurator (UFC) 208 is provided on the electrification project portal 196' providing functionality for dynamically creating Stock Keeping Units (SKU) 161 for electrification components required by the desired electrification project and searching for electrification components that match the dynamically created SKUs.

The electrification project portal 159' providing designing, specifying, searching, pricing, quoting, ordering and tracking of electrification project materials and services from the electrification project portal 196' on the electrification project management application 30f on the server network device 20 via the communications network 18, 18' for management and providing materials and services for electrification projects 159' for a for the third set of plural network devices 12, 14, 16, 20, 22, 24, 26, 27, 29, 31, 33, 37, 98-104 via the communications network 18, 18'.

In one embodiment, the electrification project management application 30f and the electrification project portal 196' provide functionality for energy audit and energy retrofits of energy consuming 140, 142 and/or energy producing components 143 as is described in FIGS. 1-15, herein. In another embodiment, the electrification project management application 30f and the electrification project portal 196' provide functionality energy audit and energy retrofits of stored power devices 145, as is described in FIGS. 1-15, herein. However, the present invention is not limited to such embodiments and other embodiments can also be used to practice the invention.

In one embodiment, the energy project retrofit management application 30e and/or the electronic energy retrofit project portal 196 and/or the electrification project management application 30f and/or the electrification project portal 196' provides functionality for: (1) contract creation and authorization between parties who desire electrification project management, energy audits and energy retrofits; and (2) collection of payment from contractor and fulfillment to provider(s). However, the present invention is not limited to such embodiments and other embodiments can also be used to practice the invention.

In one embodiment, the energy project retrofit management application 30e and/or the electronic energy retrofit project portal 196 and/or the electrification project management application 30f and/or the electrification project portal 196' provides functionality for a Facility Owner/Manager: to (1) submit a Request for Proposal (RFP) to other project owners and/or service providers; (2) see the past ratings, comments and engagements that our network of project owners and/or service providers; and (3) transact a contract, verification of completion and payment of an engagement event. However, the present invention is not limited to such embodiments and other embodiments can also be used to practice the invention.

A method and system for managing and sourcing materials and services for electrification projects is presented herein. An electrification project portal provides real-time designing, specifying, searching, pricing, quoting, ordering, and tracking of energy audit project materials and services required for a desired electrification project. An electrification project includes replacing fossil-fuel powered devices with devices powered by electricity generated from stored power devices and other electricity sources. The functionality of the electrification project portal is available in real-time directly and from within existing design programs that create and provide electrification projects and available as a standalone portal.

It should be understood that the architecture, programs, processes, methods and systems described herein are not related or limited to any particular type of computer or network system (hardware or software), unless indicated otherwise. Various types of specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

Therefore, all embodiments that come within the scope and spirit of the proceeding described and equivalents thereto are identified and claimed as the invention.

We claim:

1. A method for managing and sourcing materials and services for electrification projects, comprising:

providing an electrification project management application on a server network device with one or more processors via a communications network to a plurality of other network devices each with one or more processors for electrification projects, the electrification projects including retrofitting energy consuming components powered by fossil fuels with the energy consuming components powered by electricity created from stored power components and other electricity sources including private electrical grids and public electrical grids;

providing from the electrification project management application on the server network device, functionality for energy auditing and for the energy retrofitting of the energy consuming components powered by fossil fuels to be replaced by the energy consuming components powered by electricity created from stored power components and other electricity sources including private electrical grids and public electrical grids;

determining from the electrification project management application, which of the energy consuming components powered by fossil fuels are to be replaced with the energy consuming components powered by electricity created from stored power components for electrification projects;

determining from the electrification project management application, the stored power components, including: batteries, capacitors, long-duration energy storage (LDES) technologies, thermal energy storage (TES) devices, hydro energy storage (HES) devices, flywheel energy storage devices, compressed air storage (CAS) devices, cryogenic energy storage devices, superconducting magnetic energy storage (SMES) devices, pumped storage hydraulic energy storage (PSHES) devices, electric vehicle (EV) charging stations, EV infrastructures, or combinations thereof;

collecting periodically, dynamically and automatically on the electrification project management application on the server network device with one or more processors via the communications network, a plurality of electronic materials and services information from a plurality of different electronic information repositories on a first set of a plurality of server network devices, each with one or more processors, the electrification project management application providing electrification project development workflow and allowing electrification projects to be designed, specified, priced, quoted, tracked and materials and services delivered quicker, with increased accuracy and lower overall project costs, the plurality of different electronic information repositories including electronic information from a plurality of different manufacturers, suppliers and service providers who provide materials and services for electrification projects;

storing on the electrification project management application, the collected plurality of electrification project information in a database, using a created plurality of electrification project information attributes and taxonomies and a plurality of electronic links, the created plurality of electrification project information and attributes and the plurality of electronic links in the database providing designing, specifying, searching, pricing, quoting, ordering, and tracking of electrification project materials and services directly from the electrification project management application;

creating on the electrification project management application in the database, a plurality of internal electrification project solutions for a first set of electrification project materials and services required for a first set of a plurality of electrification projects;

automatically linking a first set of electronic information stored in the database to a first set of a plurality of electrification project materials and services from a first set of a plurality of manufacturers, suppliers and service providers using the created plurality of electronic energy audit information attributes and taxonomies and the plurality of electronic links;

receiving periodically and dynamically on the electrification project management application a set of plurality of external electrification project solutions for a second set of electrification project materials and services required for a second set of a plurality of electrification projects from a second set of server network devices each with one or more processors via the communications network, the set of plurality of external electrification project solutions created for a second set of a plurality of manufacturers, suppliers and service providers by the plurality of manufacturers, suppliers and service providers;

storing on the electrification project management application in the database the received set of the plurality of external electrification project solutions using the created plurality of electrification project information attributes and taxonomies and the plurality of electronic links;

providing an electrification project portal with the electrification project management application and database on the server network device to a third set of plurality of network devices each with one or more processors, via the communications network for managing and providing materials and services for electrification projects;

providing a design component interface on the electrification project portal allowing the third set of network devices to interface on another network device a plurality of electrification project designs for a plurality of desired electrification projects;

providing a request for design component on the electrification project portal to directly engage manufacturers, suppliers and design engineers who have expertise in designing energy efficient systems to assist in a design process for a desired electrification project;

providing a request for quote component on the electrification project portal to request price quotes for a required set of electrification project materials and services for the desired electrification project;

providing a request for order component on the electrification project portal to order the required set of electrification project materials for the desired electrification project;

providing a request for services component on the electrification project portal to request the required set of electrification project services for the desired electrification project; and providing a Universal Fixture Configurator (UFC) on the electrification project portal providing functionality for dynamically creating Stock Keeping Units (SKUs) for electrification components required by the desired electrification project and searching for electrification components that match the dynamically created SKUs, thereby providing designing, specifying, searching, pricing, quoting, ordering, and tracking of project materials and services from the electrification project portal on the electrification project management application on the server network device to the third set of plurality of network devices via the communications network for managing and providing materials and services for electrification projects.

2. The method of claim 1 wherein the electrification project management application includes one or more Artificial Intelligence (AI) methods including predictive analysis, anomaly detection, clustering analysis or a combination thereof.

3. The method of claim 1 wherein the energy consuming components include lighting, heating, ventilation, air conditioning, motors, variable, frequency drives, transformers, generators, steam boilers, water pumps, water heaters, heat pumps, and combinations thereof.

4. The method of claim 2 wherein the one or more Artificial Intelligence (AI) methods include Big Data sets.

5. The method of claim 1 wherein the electrification projects include collecting audio, visual, electronic information, three-hundred-sixty (360) degree visual information or Light Detection and Ranging (LIDR) information from energy consuming or energy producing components.

6. The method of claim 1 wherein the collecting step further includes:
applying automatically one or more Artificial Intelligence (AI) methods from the electrification project management application to collect the plurality of electronic materials and services information from the plurality of different electronic information repositories on the first set of a plurality of server network devices via the communications network; and
applying automatically one or more Artificial Intelligence (AI) methods from the electrification project management application to create the plurality of electrification project information attributes and taxonomies and the plurality of electronic links.

7. The method of claim 1 wherein the UFC allows manufacturers to enter and maintain SKU combination rules for each electrification product offering in the database via the electrification project management application,
the SKU combination rules defining how a SKU for a desired electrification project product is dynamically constructed, valid options for creating the desired electrification project product and for creating resulting desired electrification project specification.

8. The method of claim 1 wherein the electrification project management application and electrification project portal are included within an existing Computer Aided Design (CAD), Building Information Modeling (BIM) or other three-dimensional (3D) modeling program.

9. The method of claim 1 wherein the electrification project management application and electrification project portal functionality are provided via an Application Programming Interface (API) usable from other design programs.

10. The method of claim 1 wherein the network devices, the server network devices include one or more wireless communications interfaces comprising: cellular telephone, 802.11a, 802.11b, 802.11 g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Aeronautical Mobile Service (AMS), Near Field Communications (NFC), Machine-to-Machine (M2M), 802.15.1 (Bluetooth), or infrared data association (IrDA), wireless communication interfaces.

11. The method of claim 1 wherein network devices include: desktop computers, laptop computers, tablet computers, mobile phones, smart phones, personal digital/data assistants (PDA), digital cameras, 360-degree cameras, Light Detection and Ranging (LIDR) devices, unmanned aerial vehicles (UAVs), driverless vehicles, portable game consoles, wearable network devices or Internet of Things (IoT) devices.

12. The method of claim 1 wherein the server network device includes a plurality of cloud applications available to the network devices and one or more cloud databases communicating with a cloud communications network, the plurality of cloud applications providing a plurality of electrification project portal cloud services including: a cloud computing Infrastructure as a Service (IaaS), a cloud computing Platform as a Service (PaaS) and an electrification project management application component as a Software as a Service (SaaS).

13. The method of claim 11 wherein the one or more cloud databases include one or more cloud storage objects comprising one or more of a Representational State Transfer (REST) or Simple Object Access Protocol (SOAP), Lightweight Directory Access Protocol (LDAP) cloud storage objects, portions thereof, or combinations thereof, stored in the one or more cloud databases.

14. The method of claim 1 wherein the step of providing an electrification project portal further includes:
providing the electrification project portal from electrification project management application on the server network device via the communications network to a plurality of target network devices each with one or more processors,
the plurality of target network devices each including an energy audit application that created an energy audit for a desired electrification project;
sending a plurality of first messages in real-time from the electrification project portal on the electrification project management application on the server network device via the communications network to energy audit applications on the plurality of target network devices providing a design component interface, request for design component, request for quote component, request for order component and request for services component including functionality directly within the energy audit applications on the plurality of target network devices;
receiving a plurality of second messages in real-time to the energy audit applications on the plurality of target network devices via the communications network on the electrification project on the electrification project management application on the server network device requesting one or more of the design component interface, request for design component, request for quote component, request for order component and request for services component functionalities,
thereby enabling two-way, real-time communication between the electrification project management application on the server network device and the energy audit applications on the plurality of target network devices via the communications network.

15. The method of claim 1 further comprising:
receiving a new electrification project on the design component interface on the electrification project portal on the electrification project management application on the server network device via the communications network from a first energy audit application on a first target network device, wherein the new electrification project was created the first target network device with the first energy audit application; and
providing from the electrification project audit portal on the electrification project management application on the server network device via the communications network, one or more of: the request for quote component, request for order component and request for services component functionalities applied to the received new electrification project, back to the first energy audit application on the first target network device.

16. The method of claim 1 further comprising:
receiving in real-time on electrification project portal on the electrification project management application on the server network device via the communications network the, a new electrification project created on a first electrification project application on a first target network;
receiving in-real-time device on the electrification project portal on the electrification project management application on the server network device via the communications network one or more requests for one or more of design component interface, request for design component, request for quote component, request for order component and request for services component functionalities for the created new electrification project,
thereby providing real-time designing, specifying, searching, pricing, quoting, ordering, and tracking of electrification project materials and services for the created new electrification project created on the first electrification project application on the first target network device via the communications network.

17. The method of claim 16 wherein the first electrification project application is included within a Computer Aided Design (CAD), Building Information Modeling (BIM) or other three-dimensional (3D) modeling program.

18. The method of claim 16 wherein the created electrification project application project includes retrofitting existing energy consuming components in a commercial or industrial building with a plurality of electrification energy consuming components.

19. The method of claim 1 wherein the electrification project management application and the electrification project portal and an energy project retrofit management application and an energy project retrofit management provide functionality for: (1) contract creation and authorization between parties who desire electrification project management, energy audits and energy retrofits; and (2) collection of payment from contractor and fulfillment to provider(s).

20. The method of claim 1 wherein the electrification project management application and the electrification project portal and an energy project retrofit management application and an energy project retrofit management provide functionality for: (1) submitting a Request for Proposal (RFP) to other project owners and/or service providers; (2) reviewing the past ratings, comments and engagements that our network of project owners and/or service providers; and (3) transacting a contract, verification of completion and payment of an engagement event.

21. A non-transitory computer readable medium having stored therein a plurality of instructions for executing the steps of:
providing an electrification project management application on a server network device with one or more processors via a communications network to a plurality of other network devices each with one or more processors for electrification projects,
the electrification projects including retrofitting energy consuming components powered by fossil fuels with the energy consuming components powered by electricity created from stored power components and other electricity sources including private electrical grids and public electrical grids;
providing from the electrification project management application on the server network device, functionality for energy auditing and for the energy retrofitting of the energy consuming components powered by fossil fuels to be replaced by the energy consuming components powered by electricity created from stored power components and other electricity sources including private electrical grids and public electrical grids;
determining from the electrification project management application, which of the energy consuming components powered by fossil fuels are to be replaced with the energy consuming components powered by electricity created from stored power components for electrification projects;
determining from the electrification project management application, the stored power components, including: batteries, capacitors, long-duration energy storage (LDES) technologies, thermal energy storage (TES) devices, hydro energy storage (HES) devices, flywheel energy storage devices, compressed air storage (CAS) devices, cryogenic energy storage devices, superconducting magnetic energy storage (SMES) devices, pumped storage hydraulic energy storage (PSHES) devices, electric vehicle (EV) charging stations, EV infrastructures, or combinations thereof;
collecting periodically, dynamically and automatically on the electrification project management application on the server network device with one or more processors via the communications network, a plurality of electronic materials and services information from a plurality of different electronic information repositories on a first set of a plurality of server network devices, each with one or more processors,
the electrification project management application providing electrification project development workflow and allowing electrification projects to be designed, specified, priced, quoted, tracked and materials and services delivered quicker, with increased accuracy and lower overall project costs,
the plurality of different electronic information repositories including electronic information from a plurality of different manufacturers, suppliers and service providers who provide materials and services for electrification projects;
storing on the electrification project management application, the collected plurality of electrification project information in a database, using a created plurality of electrification project information attributes and taxonomies and a plurality of electronic links,
the created plurality of electrification project information and attributes and the plurality of electronic links in the database providing designing, specifying, searching, pricing, quoting, ordering, and tracking of electrification project materials and services directly from the electrification project management application;

creating on the electrification project management application in the database, a plurality of internal electrification project solutions for a first set of electrification project materials and services required for a first set of a plurality of electrification projects;

automatically linking a first set of electronic information stored in the database to a first set of a plurality of electrification project materials and services from a first set of a plurality of manufacturers, suppliers and service providers using the created plurality of electronic energy audit information attributes and taxonomies and the plurality of electronic links;

receiving periodically and dynamically on the electrification project management application a set of plurality of external electrification project solutions for a second set of electrification project materials and services required for a second set of a plurality of electrification projects from a second set of server network devices each with one or more processors via the communications network, the set of plurality of external electrification project solutions created for a second set of a plurality of manufacturers, suppliers and service providers by the plurality of manufacturers, suppliers and service providers;

storing on the electrification project management application in the database the received set of the plurality of external electrification project solutions using the created plurality of electrification project information attributes and taxonomies and the plurality of electronic links;

providing an electrification project portal with the electrification project management application and database on the server network device to a third set of plurality of network devices each with one or more processors, via the communications network for managing and providing materials and services for electrification projects;

providing a design component interface on the electrification project portal allowing the third set of network devices to interface on another network device a plurality of electrification project designs for a plurality of desired electrification projects;

providing a request for design component on the electrification project portal to directly engage manufacturers, suppliers and design engineers who have expertise in designing energy efficient systems to assist in a design process for a desired electrification project;

providing a request for quote component on the electrification project portal to request price quotes for a required set of electrification project materials and services for the desired electrification project;

providing a request for order component on the electrification project portal to order the required set of electrification project materials for the desired electrification project;

providing a request for services component on the electrification project portal to request the required set of electrification project services for the desired electrification project; and providing a Universal Fixture Configurator (UFC) on the electrification project portal providing functionality for dynamically creating Stock Keeping Units (SKUs) for electrification components required by the desired electrification project and searching for electrification components that match the dynamically created SKUs, thereby providing designing, specifying, searching, pricing, quoting, ordering, and tracking of project materials and services from the electrification project portal on the electrification project management application on the server network device to the third set of plurality of network devices via the communications network for managing and providing materials and services for electrification projects.

22. A system for automatically providing electrification projects, comprising in combination:

a plurality of network devices each with one or more processors and a non-transitory computer readable medium;

one or more server network devices each with one or more processors and a non-transitory computer readable medium;

a communications network;

for providing an electrification project management application on a server network device with one or more processors via a communications network to a plurality of other network devices each with one or more processors for electrification projects, the electrification projects including retrofitting energy consuming components powered by fossil fuels with the energy consuming components powered by electricity created from stored power components and other electricity sources including private electrical grids and public electrical grids;

for providing from the electrification project management application on the server network device, functionality for energy auditing and for the energy retrofitting of the energy consuming components powered by fossil fuels to be replaced by the energy consuming components powered by electricity created from stored power components and other electricity sources including private electrical grids and public electrical grids;

for determining from the electrification project management application, which of the energy consuming components powered by fossil fuels are to be replaced with the energy consuming components powered by electricity created from stored power components for electrification projects;

for determining from the electrification project management application, the stored power components, including: batteries, capacitors, long-duration energy storage (LDES) technologies, thermal energy storage (TES) devices, hydro energy storage (HES) devices, flywheel energy storage devices, compressed air storage (CAS) devices, cryogenic energy storage devices, superconducting magnetic energy storage (SMES) devices, pumped storage hydraulic energy storage (PSHES) devices, electric vehicle (EV) charging stations, EV infrastructures, or combinations thereof;

for collecting periodically, dynamically and automatically on the electrification project management application on the server network device with one or more processors via the communications network, a plurality of electronic materials and services information from a plurality of different electronic information repositories on a first set of a plurality of server network devices, each with one or more processors, the electrification project management application providing electrification project development workflow and allowing electrification projects to be designed, specified, priced, quoted, tracked and materials and services delivered quicker, with increased accuracy and lower overall project costs, the plurality of different electronic information repositories including electronic information from a plurality of different manufacturers, suppliers and service providers who provide materials and services for electrification projects;

for storing on the electrification project management application, the collected plurality of electrification project information in a database, using a created plurality of electrification project information attributes and taxonomies and a plurality of electronic links, the created plurality of electrification project information and attributes and the plurality of electronic links in the database providing designing, specifying, searching, pricing, quoting, ordering, and tracking of electrification project materials and services directly from the electrification project management application;

for creating on the electrification project management application in the database, a plurality of internal electrification project solutions for a first set of electrification project materials and services required for a first set of a plurality of electrification projects;

for automatically linking a first set of electronic information stored in the database to a first set of a plurality of electrification project materials and services from a first set of a plurality of manufacturers, suppliers and service providers using the created plurality of electronic energy audit information attributes and taxonomies and the plurality of electronic links;

for receiving periodically and dynamically on the electrification project management application a set of plurality of external electrification project solutions for a second set of electrification project materials and services required for a second set of a plurality of electrification projects from a second set of server network devices each with one or more processors via the communications network, the set of plurality of external electrification project solutions created for a second set of a plurality of manufacturers, suppliers and service providers by the plurality of manufacturers, suppliers and service providers;

for storing on the electrification project management application in the database the received set of the plurality of external electrification project solutions using the created plurality of electrification project information attributes and taxonomies and the plurality of electronic links;

for providing an electrification project portal with the electrification project management application and database on the server network device to a third set of plurality of network devices each with one or more processors, via the communications network for managing and providing materials and services for electrification projects;

for providing a design component interface on the electrification project portal allowing the third set of network devices to interface on another network device a plurality of electrification project designs for a plurality of desired electrification projects;

for providing a request for design component on the electrification project portal to directly engage manufacturers, suppliers and design engineers who have expertise in designing energy efficient systems to assist in a design process for a desired electrification project;

for providing a request for quote component on the electrification project portal to request price quotes for a required set of electrification project materials and services for the desired electrification project;

for providing a request for order component on the electrification project portal to order the required set of electrification project materials for the desired electrification project;

for providing a request for services component on the electrification project portal to request the required set of electrification project services for the desired electrification project; and for providing a Universal Fixture Configurator (UFC) on the electrification project portal providing functionality for dynamically creating Stock Keeping Units (SKUs) for electrification components required by the desired electrification project and searching for electrification components that match the dynamically created SKUs, thereby providing designing, specifying, searching, pricing, quoting, ordering, and tracking of project materials and services from the electrification project portal on the electrification project management application on the server network device to the third set of plurality of network devices via the communications network for managing and providing materials and services for electrification projects.

* * * * *